United States Patent
Dehne et al.

(10) Patent No.: US 11,459,032 B2
(45) Date of Patent: Oct. 4, 2022

(54) TRAILER ASSEMBLY

(71) Applicant: SLINGSHOT HAULAGE PTY LTD, Katherine (AU)

(72) Inventors: Leigh Dehne, Katherine (AU); Kevin McDonnell, Gympie (AU)

(73) Assignee: Slingshot Haulage Pty Ltd, Katherine (AU)

( * ) Notice: Subject to any disclaimer, the term of this patent is extended or adjusted under 35 U.S.C. 154(b) by 143 days.

(21) Appl. No.: 16/729,022

(22) Filed: Dec. 27, 2019

(65) Prior Publication Data
US 2020/0130743 A1    Apr. 30, 2020

Related U.S. Application Data

(63) Continuation of application No. PCT/AU2017/050660, filed on Jun. 28, 2017.

(51) Int. Cl.
| | | |
|---|---|---|
| *B62D 13/02* | (2006.01) | |
| *B60P 3/40* | (2006.01) | |
| *B62D 13/04* | (2006.01) | |
| *B62D 53/08* | (2006.01) | |

(52) U.S. Cl.
CPC .............. *B62D 13/025* (2013.01); *B60P 3/40* (2013.01); *B62D 13/04* (2013.01); *B62D 53/0842* (2013.01)

(58) Field of Classification Search
CPC .. D62D 13/052; D62D 13/04; D62D 53/0842; D62D 13/00; D62D 13/005; D62D 63/065; D62D 53/028; D62D 13/025; B60P 3/40
See application file for complete search history.

(56) References Cited

U.S. PATENT DOCUMENTS

| | | | | |
|---|---|---|---|---|
| 4,149,732 | A | | 4/1979 | Watkins, Jr. |
| 5,366,059 | A | * | 11/1994 | Demong ................ B62D 13/04 |
| | | | | 198/303 |
| 6,050,578 | A | | 4/2000 | Beck |
| 6,059,056 | A | * | 5/2000 | Becker ................ B62D 7/1509 |
| | | | | 180/24.01 |
| 6,494,476 | B2 | * | 12/2002 | Masters ............... B62D 13/005 |
| | | | | 280/419 |

(Continued)

FOREIGN PATENT DOCUMENTS

| | | | | |
|---|---|---|---|---|
| CA | 2566451 | | 12/2007 | |
| EP | 0053001 | | 6/1982 | |
| EP | 0053001 | A1 * | 6/1982 | ............. B62D 13/00 |

OTHER PUBLICATIONS

Jujnovich B. et al., 'Comparative performance of semi-trailer steering systems', 7th International Symposium on Heavy Vehicle Weights and Dimensions, Delft, The Netherlands, Europe, Jun. 16-20, 2002.

*Primary Examiner* — Minnah L Seoh
*Assistant Examiner* — Harold Eric Pahlck, III
(74) *Attorney, Agent, or Firm* — Reinhart Boerner Van Deuren P.C.

(57) ABSTRACT

A trailer assembly with improved lateral support structure and steering system control of the axial wheels on a front elongated trailer and a rear elongated trailer to remain in a collinear following configuration to carry elongated loads extending over the extended lengths of the combination of the front elongated trailer and the rear elongated trailer and allow ready turning control.

20 Claims, 16 Drawing Sheets

(56) References Cited

U.S. PATENT DOCUMENTS

| | | | | |
|---|---|---|---|---|
| 8,419,032 B1* | 4/2013 | McGhie | ............... | B62D 13/04 280/124.157 |
| 2002/0066615 A1 | 6/2002 | Boyd | | |
| 2015/0284041 A1 | 10/2015 | Kern | | |

* cited by examiner

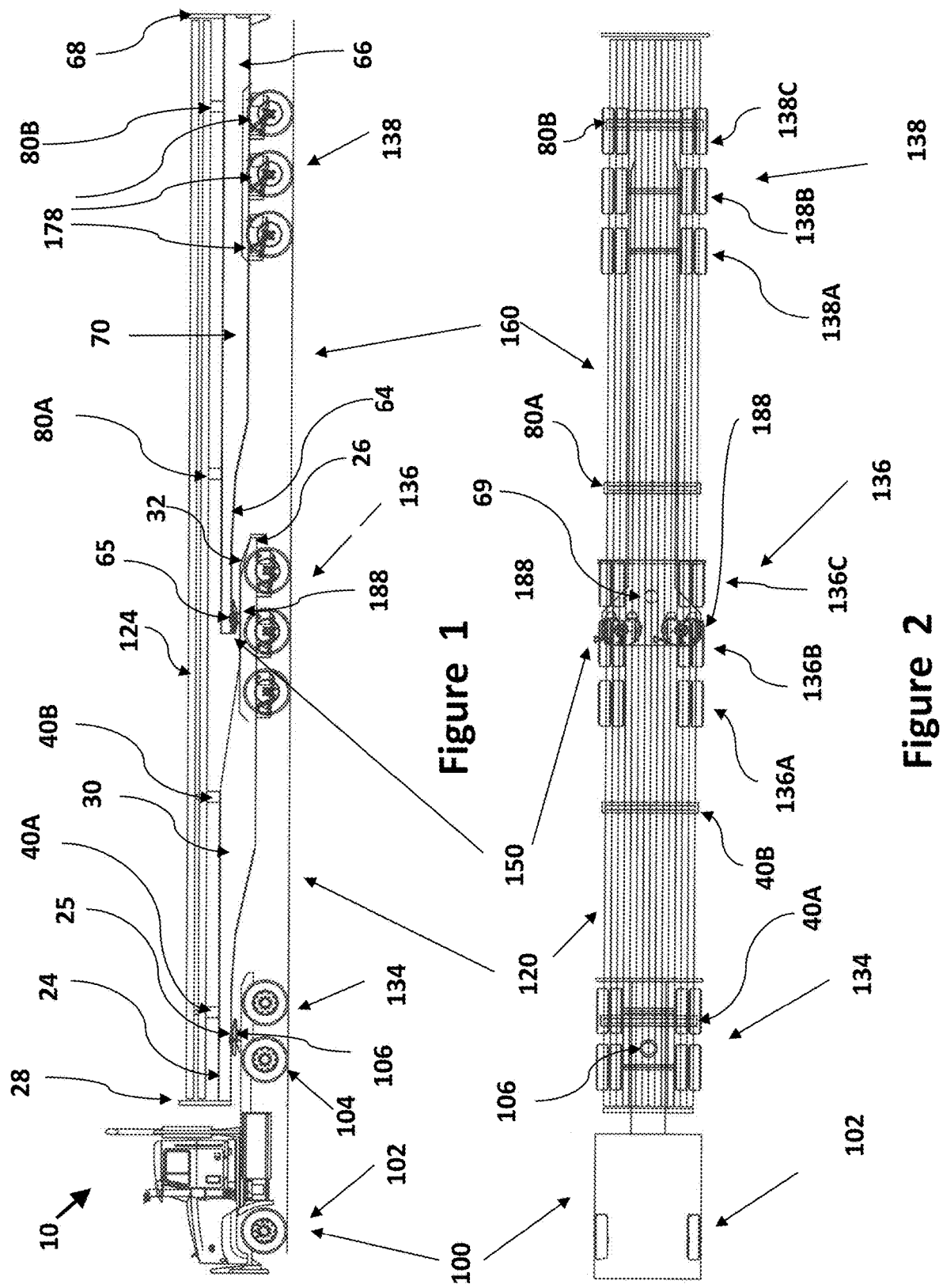

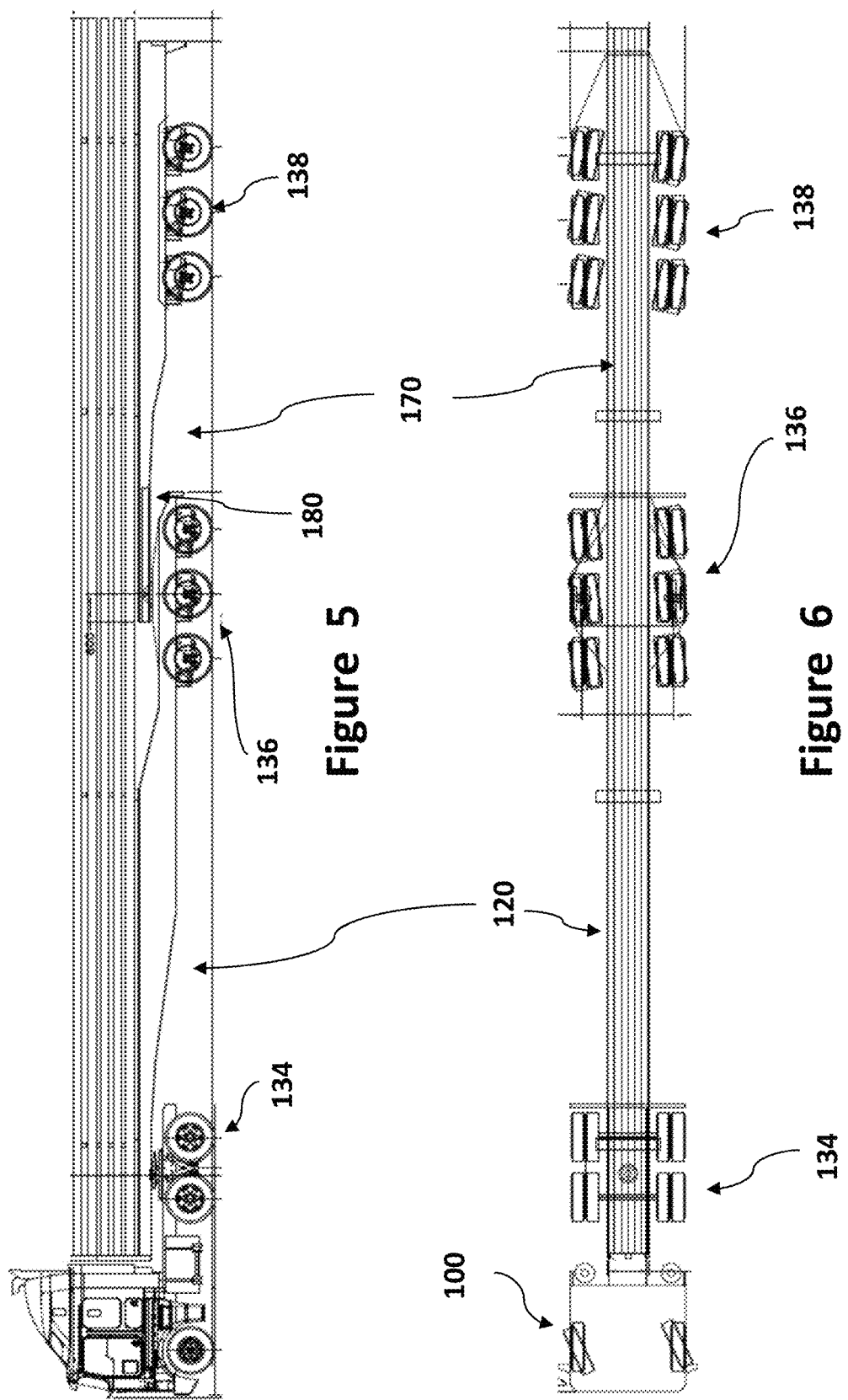

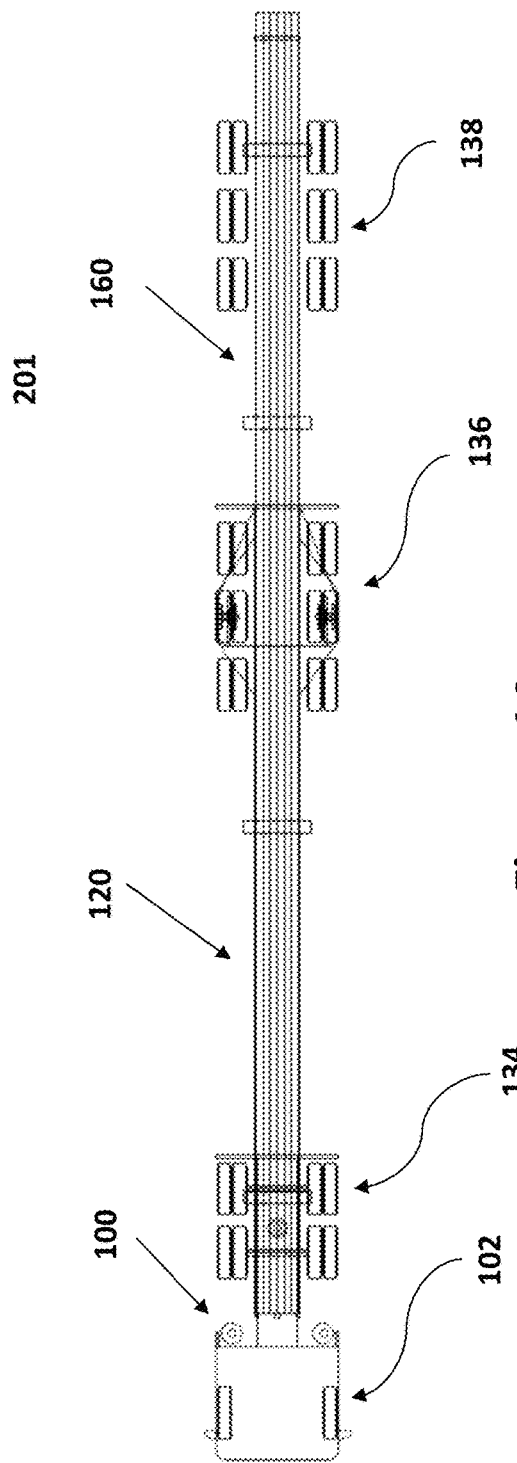
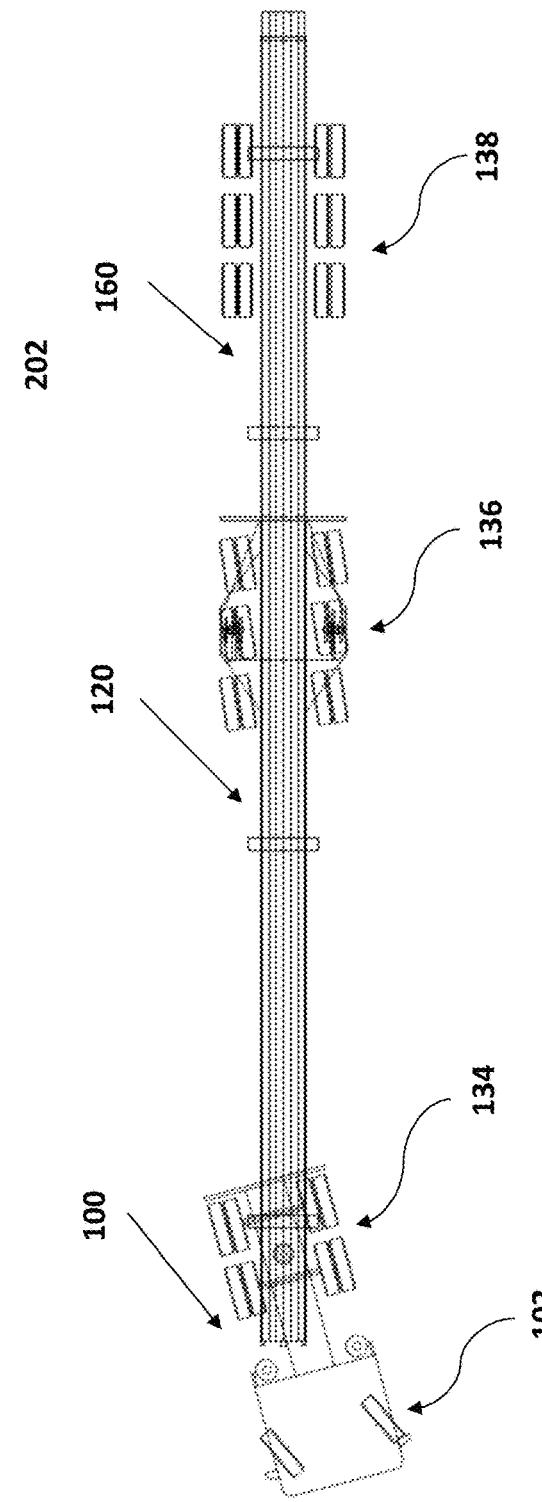

TRAILER ASSEMBLY

CROSS-REFERENCE TO RELATED PATENT APPLICATION

This patent application is a continuation of PCT/AU2017/050660, filed Jun. 28, 2017, the entire teachings and disclosure of which are incorporated herein by reference thereto.

FIELD OF THE INVENTION

The present invention relates to a trailer assembly and in particular to a method and apparatus of a steering and support of a trailer assembly for transporting long loads.

The invention has been developed primarily for use in transporting railway lines and long plastics conduits and will be described hereinafter with reference to this application. However, it will be appreciated that the invention is not limited to this particular field of use.

BACKGROUND OF THE INVENTION

It is generally difficult and expensive to transport very long (about 25 metres or more) items such as railway lines or plastic pipes. Presently, extendable trailers are used to transport these materials. It is desirable to provide a much more cost-effective way to transport such materials, preferably with an increase in pay load.

It is known on double B trailers to have multiple trailers which are connected lengthwise with pivotal connections between each. This is acceptable and useful if carrying large quantities of loads but only where the size of the load is no greater than any one of the trailers. With such pivotal connections of loads the following trailer is able to pivot around a vertical axis of the pivotal join to the preceding trailer and thereby move out of rectilinear configuration of the multiple trailers into a curvilinear configuration. This has no consequence to the load if each is withheld in one only of respective trailers.

The difficulty is when loads extend beyond the length of a trailer. If the trailers were pivotally mounted and the following trailer is able to pivot around a vertical axis of the pivotal join to the preceding trailer and thereby move out of rectilinear configuration of the multiple trailers into a curvilinear configuration, the load would either need to flex to the curvilinear configuration or break or cut across the trailers and shift and still break. One aspect is that when two trailers move from the rectilinear configuration of the multiple trailers into a curvilinear configuration the shortest distance between the front of the front trailer and the rear of the rear trailer becomes shorter. Also, the shortest distance being a straight line between those two points no longer overly the bodies of the trailers. In essence, such systems cannot support and transport long loads.

The present invention seeks to overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE INVENTION

According to a first aspect, the present invention provides a trailer assembly comprising: a lead trailer comprising a body having a front end and a rear end, the front end comprising connection means for connection to a prime mover and the rear end comprising at least one lead trailer wheel assembly having a self-steering axle; a rear trailer comprising a body having a front end and a rear end, the rear end comprising at least one rear trailer wheel assembly; and coupling means between the lead trailer and the rear trailer, the coupling means allowing the rear trailer to pivot relative to the lead trailer only about a generally horizontal coupling axis extending transverse to the longitudinal length of the lead trailer.

The invention in another aspect provides a trailer assembly comprising: a lead trailer comprising a body having a front end and a rear end, the front end comprising connection means for connection to a prime mover and the rear end comprising at least one lead trailer wheel assembly having a self-steering axle; a rear trailer comprising a body having a front end and a rear end, the rear end comprising at least one rear trailer wheel assembly; and a coupling means between the lead trailer and the rear trailer, wherein the coupling means comprises two laterally spaced connections between following connected trailers to substantially prevent pivoting of one trailer to another around a vertical axis.

Preferably the coupling means allows the rear trailer to pivot relative to the lead trailer substantially about a generally horizontal coupling axis extending transverse to the longitudinal length of the lead trailer.

The trailer can include a steering control means for controlling at least one lead trailer wheel assembly of a multiple axle wheel assembly acting separately or in unison and at least one rear trailer wheel assembly of a multiple axle wheel assembly acting separately or in unison wherein the operation between the lead trailer wheel assembly and the rear trailer wheel assembly is coordinated with the coupling.

The steering control means controls automatically, the at least one lead trailer wheel assembly of a multiple axle wheel and the at least one rear trailer wheel assembly of a multiple axle wheel.

The trailer automatic control of the steering control means can be effected when the at least one lead trailer wheel assembly of a multiple axle wheel and the at least one rear trailer wheel assembly of a multiple axle wheel reach predetermined effecting angles relative to the angle of the at least one lead trailer wheel assembly or the at least one rear trailer wheel assembly to the first and second trailer.

Preferably the automatic control of the steering control means is effected when the at least one lead trailer wheel assembly of a multiple axle wheel and the at least one rear trailer wheel assembly of a multiple axle wheel reach predetermined effecting angles relative to the angle of the prime mover to the first and second trailer.

The steering control means can control steering automatically such that when a turn in a first direction is effected by the steering wheels of a prime mover:
 a. initially the supporting wheels of the front trailer are turning in the first direction until reaching a predetermined maximum turning angle and while the supporting wheels of the rear trailer are in a straight-ahead position; and
 b. the halting of the turning of the supporting wheels of the front trailer and the turning in a second direction being to the opposite side of first direction of the supporting wheels of the rear trailer so that the rear wheels can steer in a continuous C-curve or reverse C-curve by the motion effected by the steering and pulling motion of the prime mover and the front trailer;

c. the straightening and or turning of the steering wheels of the prime mover further switching to effect, by the motion effected by the steering and pulling motion of the prime mover back to a substantially straight position of the supporting wheels of the front trailer and the supporting wheels of the rear trailer returning to a straight-ahead position.

The steering control means includes one or more of:
d. hydraulic cylinders
e. pneumatic actuators
f. electric actuators
g. mechanical means to aid control of the at least one lead trailer wheel assembly of a multiple axle wheel and the at least one rear trailer wheel assembly of a multiple axle wheel.

Preferably, the connection means of the lead trailer comprises a kingpin.

Preferably, the lead trailer comprises at least two lead trailer wheel assemblies each having a self-steering axle.

More preferably, the lead trailer comprises at least three lead trailer wheel assemblies each having a self-steering axle.

Preferably, the rear trailer comprises at least one rear trailer wheel assembly having a self-steering axle.

More preferably, the rear trailer comprises at least two rear trailer wheel assemblies.

More preferably, the rear trailer comprises at least three rear trailer wheel assemblies, at least one of the rear trailer wheel assemblies having a self-steering axle.

Preferably, the coupling means comprises a coupling assembly comprising at least two laterally spaced connection means between the lead trailer and the rear trailer.

More preferably, the coupling means comprises a coupling assembly comprising at least two laterally spaced fifth wheel couplings provided at the rear end of the lead trailer and at least two corresponding kingpins provided at a front end of the rear trailer.

Preferably, the rear trailer comprises a central kingpin for connecting with a fifth wheel coupling of the prime mover.

Preferably, the lead trailer comprises a bulkhead at the front end thereof.

Preferably, the lead trailer comprises a load floor or load space which extends from the front end to about three quarters of the length towards the rear end.

Preferably, the rear end of the lead trailer includes an upper portion which is at a reduced height level relative to the load floor or load space.

Preferably, at least a portion of the coupling means is disposed at the upper portion.

Preferably, the rear trailer comprises a bulkhead at the rear end thereof.

Preferably, the rear trailer comprises a load floor or load space which extends from the front end to the rear end thereof.

Preferably, the rear trailer comprises a reduced width portion for most of its length.

Preferably, the coupling means substantially prevents the rear trailer from pivoting relative to the lead trailer about any vertical axis.

Preferably, the coupling means substantially prevents the rear trailer from pivoting relative to the lead trailer about a horizontal axis generally aligned with the longitudinal length of the lead trailer.

Preferably, the coupling means provides a maximum decline angle of the rear trailer relative to the lead trailer of about 8° and/or a maximum incline angle of about 8°.

The present invention also provides a transport assembly comprising a prime mover to which is attached the trailer assembly in accordance with the above, the lead trailer being connected to the prime mover and the rear trailer being coupled to the lead trailer.

Preferably, the transport assembly further comprises a load carried by the trailers, the load extending from the front end of the lead trailer to the rear end of the rear trailer.

The present invention also provides a transport assembly comprising a prime mover to which is attached the trailer assembly in accordance with the above, the rear trailer being connected to the prime mover and the lead trailer being loaded onto the rear trailer.

The present invention also provides a coupling assembly for coupling a lead trailer to a rear trailer, the coupling assembly allowing the rear trailer to pivot relative to the lead trailer only about a generally horizontal coupling axis extending transverse to the longitudinal length of the lead trailer.

The coupling means can comprise two laterally spaced connections between following connected trailers to substantially prevent pivoting of one trailer to another around a vertical axis.

The trailer assembly can have a locking means on at least one lead trailer wheel assembly having at least one self-steering axle or a multiple axle wheel assembly acting in unison and a locking means on the rear trailer comprises a rear trailer wheel assembly having at least one self-steering axle or a multiple axle wheel assembly acting in unison.

In a particularly preferred form, the trailer assembly of claim 3 further includes a control for controlling the locking means automatically such that h. initially the locking mechanism is able to effect the supporting wheels of the front trailer to be in an unlocked self-steering mode until reaching a predetermined maximum turning angle and while the supporting wheels of the rear trailer are in a locked straight-ahead position; and i. switching of the locking mechanism effects the locking of the supporting wheels of the front trailer and unlocking of the supporting wheels of the rear trailer so that the rear wheels can self-steer by the motion effected by the steering and pulling motion of the prime mover and the front trailer;

j. further switching of the locking mechanism to effect, after self-steering by the motion effected by the steering and pulling motion of the prime mover back to a substantially straight position, of the supporting wheels of the front trailer to be in an unlocked self-steering mode and the supporting wheels of the rear trailer are in a locked straight-ahead position.

Preferably, the coupling assembly comprises at least two laterally spaced connection means between the lead trailer and the rear trailer.

More preferably, the coupling assembly comprises at least two laterally spaced fifth wheel couplings provided at the rear end of the lead trailer and at least two corresponding kingpins provided at a front end of the rear trailer.

The present invention also provides a method of coupling a lead trailer to a rear trailer, the method allowing the rear trailer to pivot relative to the lead trailer only about a generally horizontal coupling axis extending transverse to the longitudinal length of the lead trailer.

In one form the trailer assembly coupling means provides a high torsion connection and wherein the coupling means includes an elongated shaped engaging means mounted pivotably between two supports so as to extend in a transverse direction to the elongated length a first of the trailers; a raised shape receiving means that is hollow and overlies a cut-out in a second of the trailers for receiving and engaging the elongated shaped engaging means; a locking means for locking laterally in relative fixed positions the elongated shaped engaging means and the raised shape receiving means; wherein the connected trailers are substantially prevented from relatively pivoting around a vertical axis but have limited pivoting around a transverse horizontal axis to allow limited different dipping relative to each other.

The present invention also provides a trailer comprising a body having a front end and a rear end, the front end comprising connection means for connection to a prime mover and the rear end comprising at least two wheel assemblies each having a self-steering axle, the rear end further comprising at least two laterally spaced fifth wheel couplings.

The present invention also provides a trailer comprising a body having a front end and a rear end, the front end comprising connection means for connection to a prime mover and the rear end comprising at least two wheel assemblies, at least one of the wheel assemblies having a self-steering axle, the front end further comprising at least two laterally spaced kingpins.

Preferably, at least one of the lead and the rear trailers is an extendable trailer.

In one embodiment, the at least one rear trailer wheel assembly comprises a manually steered axle.

In another embodiment, the rear trailer comprises at least two rear trailer wheel assemblies, at least one of the rear trailer wheel assemblies having a self-steering axle and at least another one of the rear trailer wheel assemblies having a manually steered axle.

In one form of the invention the trailer assembly can have the lead trailer comprising at least one lead trailer wheel assembly each having a self-steering axle and the rear trailer comprising at least one rear trailer wheel assembly each having a self-steering axle.

Preferably the rear trailer wheel assembly self-steering axles are operative in accordance with the determined operation of the at least one lead trailer wheel assembly self-steering axle when in a slow turning operation. The slow turning operation is undertaken at less than 30 kilometres per hour.

The rear trailer wheel assembly self-steering axles can be locked until the determined operation of the at least one lead trailer wheel assembly self-steering axle reaches a limiting turn angle. The limiting turn angle is a predetermined angle which can be in the range of 4 degrees to 10 degrees and is preferably substantially of 6 degrees.

The determined operation of the at least one lead trailer wheel assembly self-steering axle can be detected wirelessly by a detector mounted at or near the rear trailer wheel assembly self-steering axles. The detector preferably is an optical sensor detecting the turning angle of the at least one lead trailer wheel assembly self-steering axle and whether a limiting turn angle is reached.

The detector can be associated with a activator for locking or unlocking the rear trailer wheel assembly self-steering axles upon the at least one lead trailer wheel assembly self-steering axle being detected by the detector to have reached the limiting turn angle and unlock the rear trailer wheel assembly self-steering axles or reaching a straight ahead angle and locking the rear trailer wheel assembly self-steering axles. Preferably the activator for locking or unlocking the rear trailer wheel assembly self-steering axles is a solenoid.

The invention also provides a method of transporting and steering extensive elongated loads using a prime mover and multiple elongated trailers each having a set of rear wheels comprising the steps of:
k. Providing a pivotal connection at a front of a front trailer around a vertical axis for connection to and pulling by a prime mover;
l. Providing a connection between an overlapping rear of the front trailer and the front of the rear trailer over a rear set of supporting wheels of the front trailer
m. Providing lateral stability coupling systems on the sides of the overlapping rear of the front trailer and the front of the rear trailer substantially preventing pivoting rotation of one trailer to the connected other trailer around a vertical axis;
n. Providing a locking mechanism for a part of or the set of supporting wheels of the front trailer and the rear trailer;
o. Controlling the locking mechanism of the part of or the set of supporting wheels of the front trailer and the rear trailer such that generally, if the supporting wheels of the front trailer are locked, the supporting wheels of the rear trailer are unlocked and able to self-steer by the motion effected by the steering and pulling motion of the prime mover.

In the method, a turn can be effected by steering the prime mover in the steps of:
i. initially the locking mechanism effecting the supporting wheels of the front trailer to be in an unlocked self-steering mode until reaching a predetermined maximum turning angle and while the supporting wheels of the rear trailer are in a locked straight-ahead position; and
ii. switching of the locking mechanism to effect the locking of the supporting wheels of the front trailer and unlocking of the supporting wheels of the rear trailer so that the rear wheels can self-steer by the motion effected by the steering and pulling motion of the prime mover and the front trailer;
iii. further switching of the locking mechanism to effect, after self-steering by the motion effected by the steering and pulling motion of the prime mover back to a substantially straight position, of the supporting wheels of the front trailer to be in an unlocked self-steering mode and the supporting wheels of the rear trailer are in a locked straight-ahead position.

The lateral stability coupling systems includes providing provides a high torsion connection and wherein the coupling means can include an elongated shaped engaging means mounted pivotably between two supports so as to extend in a transverse direction to the elongated length a first of the trailers; a raised shape receiving means that is hollow and overlies a cut-out in a second of the trailers for receiving and engaging the elongated shaped engaging means; a locking means for locking laterally in relative fixed positions the elongated shaped engaging means and the raised shape receiving means; wherein the connected trailers are substantially prevented from relatively pivoting around a vertical axis but have limited pivoting around a transverse horizontal axis to allow limited different dipping relative to each other.

It can be seen that in one form the invention provides broadly 2 main issues:
The two trailers have a coupling that generally limits articulation between the trailers to rotation about a horizontal axis that is perpendicular to the longitudinal axis of the trailers.

The steering of the axles on the trailers is controlled to ensure that the vehicle swept path meets transport department requirements.

Other aspects of the invention are also disclosed.

BRIEF DESCRIPTION OF THE DRAWINGS

Notwithstanding any other forms which may fall within the scope of the present invention, preferred embodiments of the present invention will now be described, by way of examples only, with reference to the accompanying drawings in which:

FIG. 1 is a side view of a transport assembly comprising a trailer assembly in accordance with a first preferred embodiment of the present invention in an in-use configuration, with the trailer assembly having a front trailer and a rear trailer extending linearly and being pivotally connected in a first manner, and shown attached to a prime mover and carrying a load of rail lengths;

FIG. 2 is a top view of the transport assembly of FIG. 1 when moving in a straight direction;

FIGS. 5 and 6 are a side view and top view respectively of a transport assembly comprising a trailer assembly in accordance with a second preferred embodiment of the present invention in an in-use configuration, the trailer assembly having a front trailer and a rear trailer extending linearly and being pivotally connected in a second manner, and shown attached to a prime mover and carrying a load of rail lengths;

FIGS. 14 to 17 are overhead diagrammatic views of the operation of the sets of triaxial wheels when progressing between positions 201 to 204 and back to 201 identified in FIG. 13;

DESCRIPTION OF EMBODIMENTS

Figure 3:
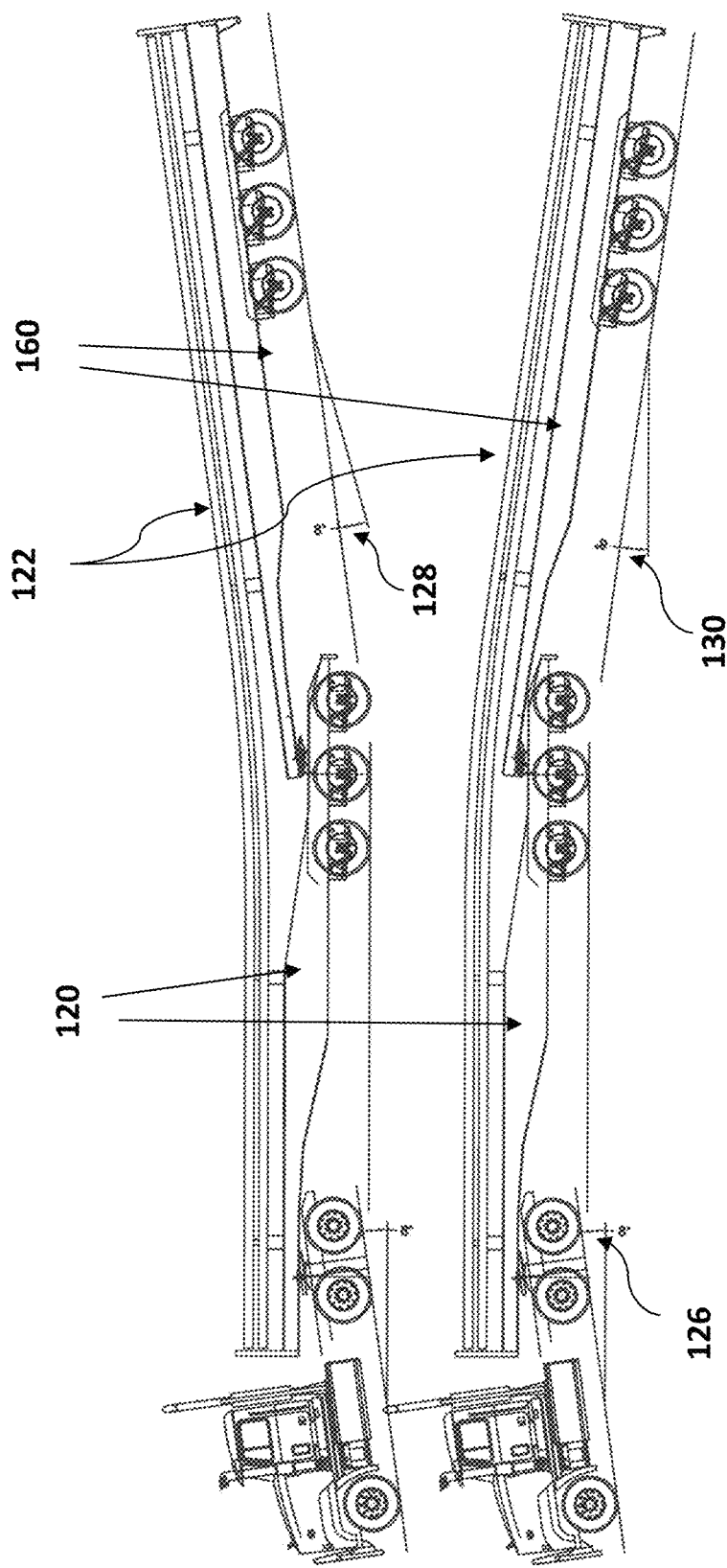
FIG. 3 shows schematic side views of the transport assembly of FIG. 1 with the prime mover at a maximum decline angle relative to the lead trailer, with (a) the rear trailer at a maximum decline angle relative to the lead trailer and (b) the rear trailer at a maximum incline angle relative to the lead trailer

It should be noted in the following description that like or the same reference numerals in different embodiments denote the same or similar features.

It should be noted that the embodiments show different combinations of:

p. Multiple elongated trailer systems;
q. Lateral stability coupling systems for joining of the multiple elongated trailer systems;
r. Axial wheel locking systems; and
s. Steering control systems.

However various combinations are within the scope of the invention. Therefore, although the description describes each element and might describe it with one other of the features but is done so as to be illustrative and not to be limited to that combination.

FIGS. 1 and 2 show a first embodiment of a transport assembly which comprises a prime mover 100 to which is attached a trailer assembly of a front elongated trailer 120 and a rear elongated trailer 160. The trailer assembly 10 in the embodiment is shown carrying a load of rail lengths 124 that extend over the extended lengths of the combination of the front elongated trailer 120 and the rear elongated trailer 160. It can be seen therefore that the front elongated trailer 120 and the rear elongated trailer 160 need to remain in a collinear following configuration to carry such elongated loads extending over the extended lengths of the combination of the front elongated trailer 120 and the rear elongated trailer 160.

The prime mover 100, as is known, comprises front steering wheels 102, rear drive wheels 104, and a fifth wheel coupling 106. The trailer assembly 10 comprise a lead trailer 120 (A-trailer) and a rear trailer 160 (B-trailer), which are both generally flatbed trailers.

The lead trailer 20 comprises a body 22 having a front end 24 and a rear end 26. The lead trailer 20 also comprises a bulkhead 28 at the front end 24, and a load floor or load space 30 which extends from the front end 24 to about three quarters of the length towards the rear end 26. The rear end 26 includes an upper portion 32 which is at a reduced height level relative to the load floor or load space 30. The front end 24 includes a kingpin 25 at a lower surface thereof for coupling to the fifth wheel coupling 106 of the prime mover 100.

The upper portion 32 of the rear end 26 includes lateral stability coupling systems 150 for joining of the multiple elongated trailers 120 and 160. In this embodiment, the lateral stability coupling systems 150 comprises two fifth wheel couplings 188 and 188 mounted on the top rear of the front trailer 120 in a laterally spaced configuration near either side of the front trailer 120.

The rear end 26 of the trailer 120 is supported by three axial wheel assemblies 136A to 136C, each comprising a respective self-steering axle. The load floor or load space 30 comprises two spaced load bars 40A and 40B which extend transversely to the longitudinal length of the lead trailer 120.

The rear trailer 160 comprises a body having a load floor or load space 70 which extends from the front end 64 to a rear bulkhead 68 at the rear end 66. The front end 64 includes two laterally spaced kingpins 65 at a lower surface thereof for respective coupling to the fifth wheel couplings 188 of the lead trailer 120. The front end 64 also includes a central kingpin 69 at the lower surface thereof for coupling to the fifth wheel coupling 106 of the prime mover 100 when required as further described below.

The rear end 66 is supported by three wheel assemblies 138A to 138C, with the wheel assemblies 138A and 138B having fixed axles, and rearmost wheel assembly 138C comprising a self-steering axle.

The load floor or load space 70 also comprises two spaced load bars 80A and 80B which extend transversely to the longitudinal length of the rear trailer 160. The load floor or load space 70 of the body of the rear trailer 160 can include a reduced width portion for most of its length to lighten its weight.

In the embodiment, the trailer assembly 10 can be used to transport a load 124 of twenty-five metre rail lengths, which are arranged in an array of fourteen rail lengths wide and two rail lengths high (twenty-eight rail lengths in total). The load 124 of rail lengths are supported by the load bars 40A and 40B on the front trailer 120 and 80A and 80B, with intermediate load bars between the first and second rail length layers at the position of and overlying the load bars 40A, 40B and 80A and 80B.

Coupling—Fifth Wheel to Prime Mover

Referring to FIG. 3, the fifth wheel coupling 106 of the prime mover 100 to which is coupled the kingpin 25 of the lead trailer 20 in use provides a tow point, as well as a point of articulation between the prime mover 100 and the lead trailer 20. As is known, the fifth wheel coupling 106 can pivot about a pivot axis which is horizontal (generally parallel to the ground) and transverse (perpendicular) to the longitudinal length of the prime mover 100. This allows the prime mover 100 to pivot relative to the lead trailer 120 at a maximum decline angle 126 of about 8°. The kingpin 25 also provides a vertical axis articulation point between the prime mover 100 and the lead trailer 20.

Coupling—Fifth Wheel from Trailer A to Trailer B

Fifth wheel couplings 134a and 134b can be used to connect leading trailer 120 and rear trailer 160. However, such systems are preferably only useable for up to 5 to 6 tonnes per triaxle of wheels. This is due to the high torsion rates for greater weights over the length of the trailers 120, 160 and only held by two laterally spaced fifth wheel couplings 188 which thereby resist lateral and rotational torsion.

The coupling assembly 150 between the lead trailer 120 and the rear trailer 160, comprising the two fifth wheel couplings 188 to which are coupled the respective kingpins 25 and 65 in use, provides a tow point between the lead trailer 120 and the rear trailer 160.

The two laterally spaced fifth wheel couplings 188 are also respectively pivotable about respective, and aligned, pivot axes which are also horizontal (generally parallel to the ground) and perpendicular (transverse) to the longitudinal length of the lead trailer 120. The two pivot axes define a coupling axis which allows the rear trailer 160 to pivot relative to the lead trailer 120 only about the horizontal coupling axis. The coupling assembly 150, from the lateral spacing of the fifth wheel couplings 188 and the respective kingpins 25 and 65, substantially prevents the rear trailer 160 from pivoting relative to the lead trailer 120 about any vertical axis.

As shown in FIG. 3, the rear trailer 160 is maintained in a generally aligned orientation to the lead trailer 120. The coupling axis provides a maximum decline angle 128 of the rear trailer 60 relative to the lead trailer 120 of about 8°, or a maximum incline angle 130 of also about 8°. The load 120, in the embodiment being rail lengths 122, bend when the rear trailer 160 pivots about the horizontal coupling axis relative to the lead trailer 120.

Coupling—High Torsion Coupling from Trailer A to Trailer B

The high torsion coupling 200 is a novel and inventive way of connecting leading trailer 120 and rear trailer 160. This system is useable for up to 20 tonnes per triaxle of wheels. This is due to the particular engaging structure allowing absorption of high torsion rates without breaking for greater weights over the length of the trailers 120, 160 when only held by two pivoting fifth wheel couplings 188 in the coupling system 150.

Figure 7:
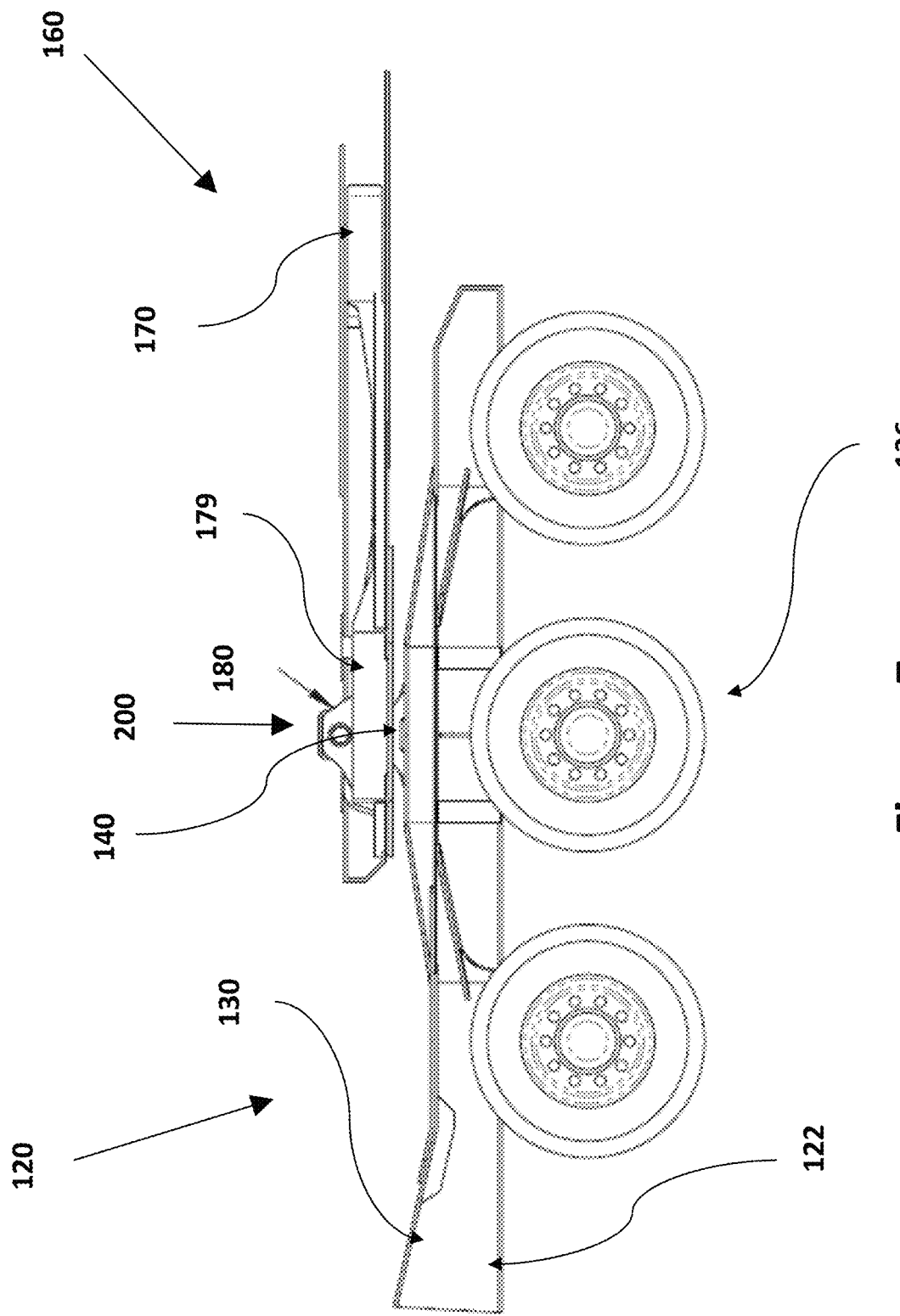
FIGS. 7 and 8 are a detail of a side view and top view respectively of a joining of the trailer assembly having a front trailer and a rear trailer extending linearly and being pivotally connected in a second manner of FIGS. 5 and 6.
Figure 8:
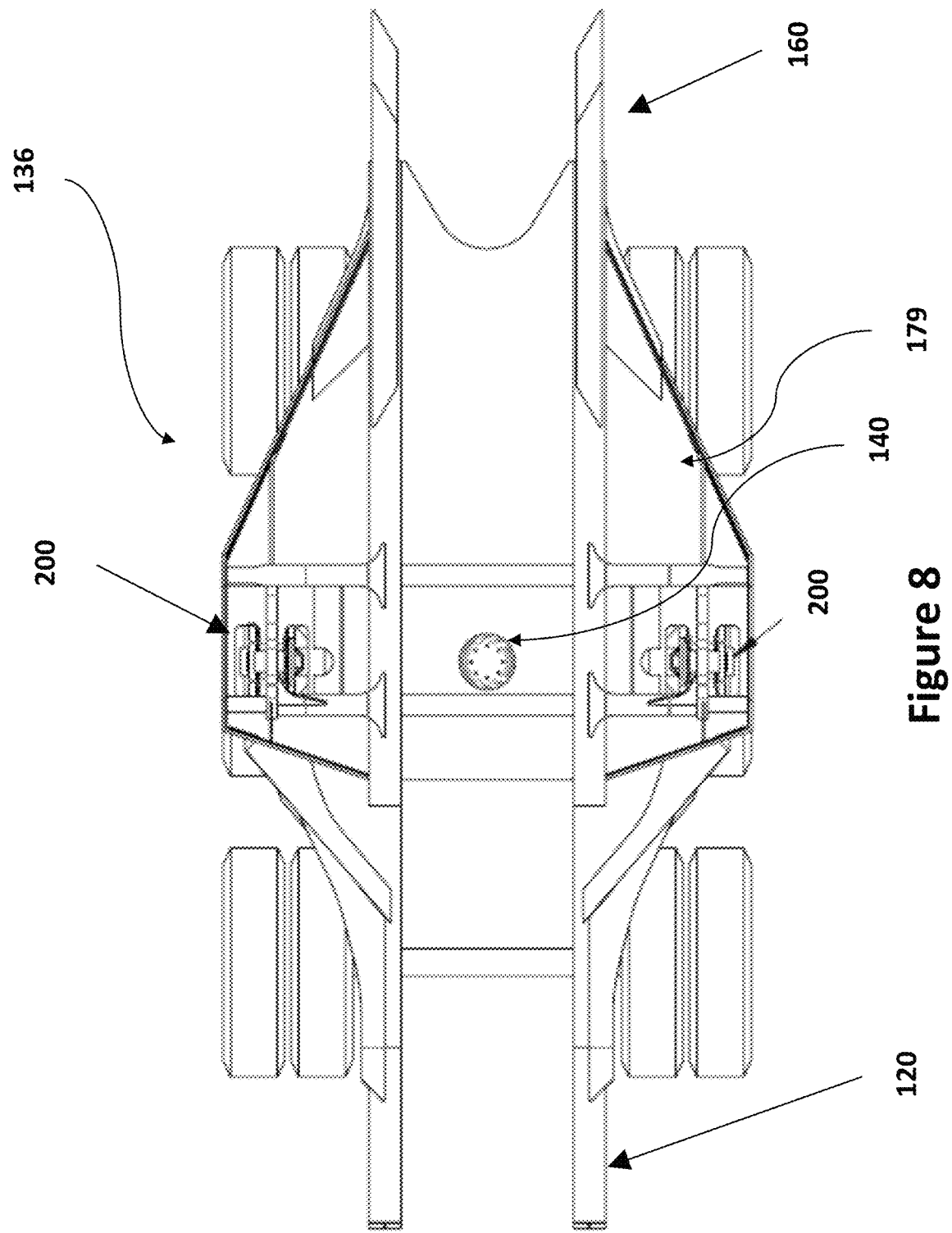

Referring to FIGS. 7 and 8 there are two laterally placed high torsion couplings 200 each of which comprises a first connection 140 at an upper rear portion of the first trailer 120 being Trailer A that connects and couples with a second interengaging portion 180 at a front portion of the second trailer 160 being trailer B. The location of the first connection 140 at the rear of the first trailer 120 is above the triaxle wheel set 136. However, the tray 130 of the first trailer 120 dips at the rear portion to support a framework 139 for the first connection 140 so that the front portion of the second trailer 160 can overly the rear portion of the front trailer 120 and the second connection 180.

Figure 9:
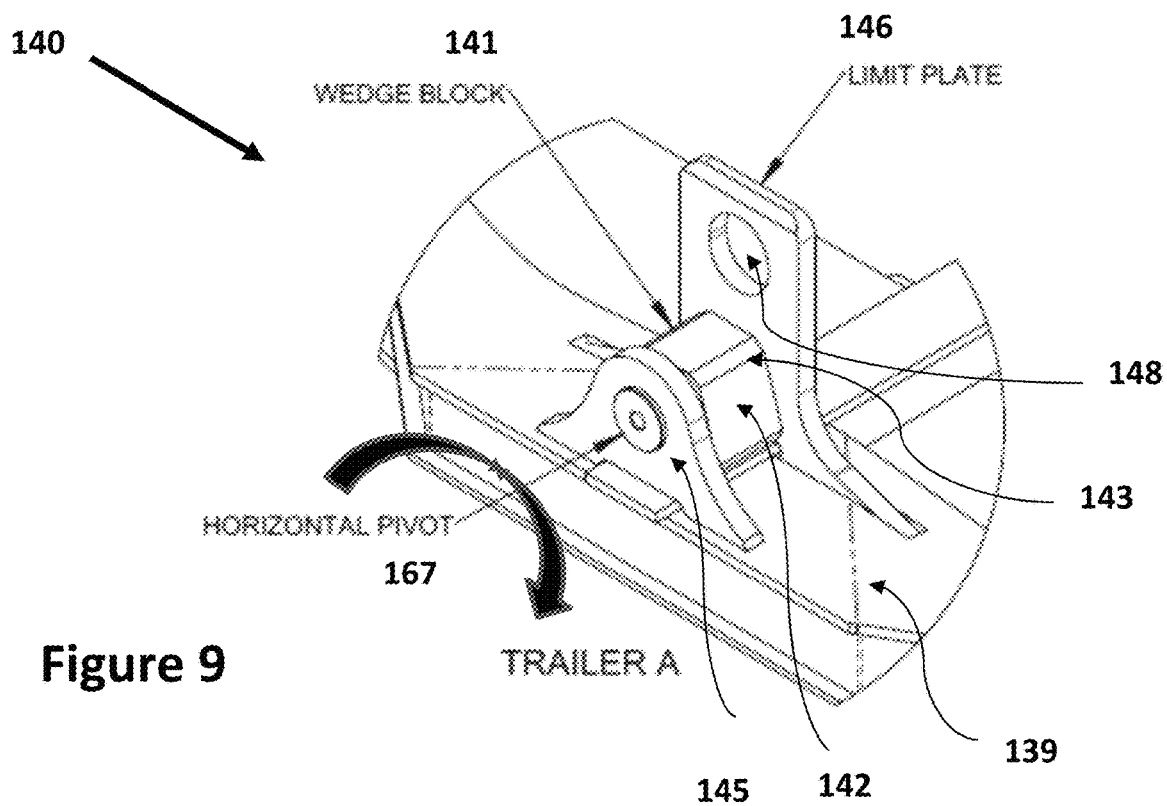
FIGS. 9 to 12 are details of operative connected parts of the lateral pivot supports in the form of pivot and wedge assemblies on the sides of the front trailer and a rear trailer extending linearly and being pivotally connected in a second manner of FIGS. 5 and 6.
Figure 10:
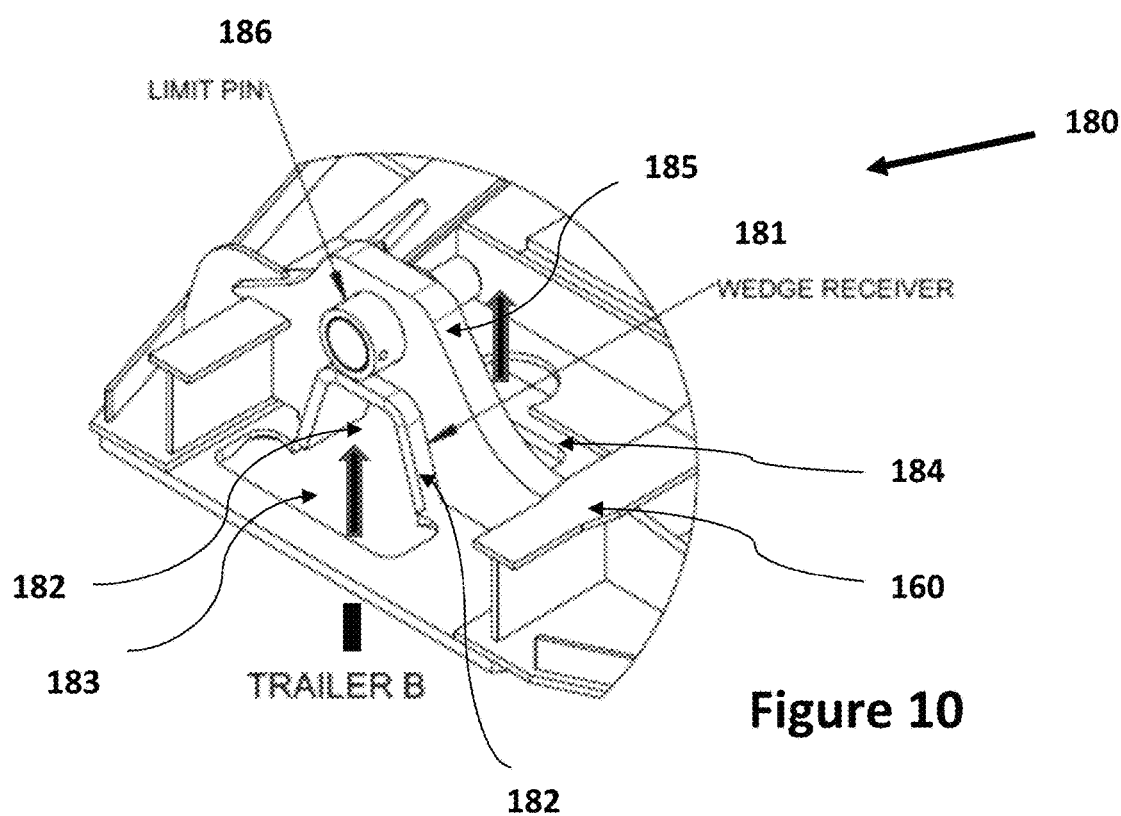

FIG. 9 that shows the first connection 140 upper rear portion of the first trailer 120 being Trailer A that connects and couples with a second interengaging portion 180 at a front portion of the second trailer 160 being trailer B.

Figure 11:
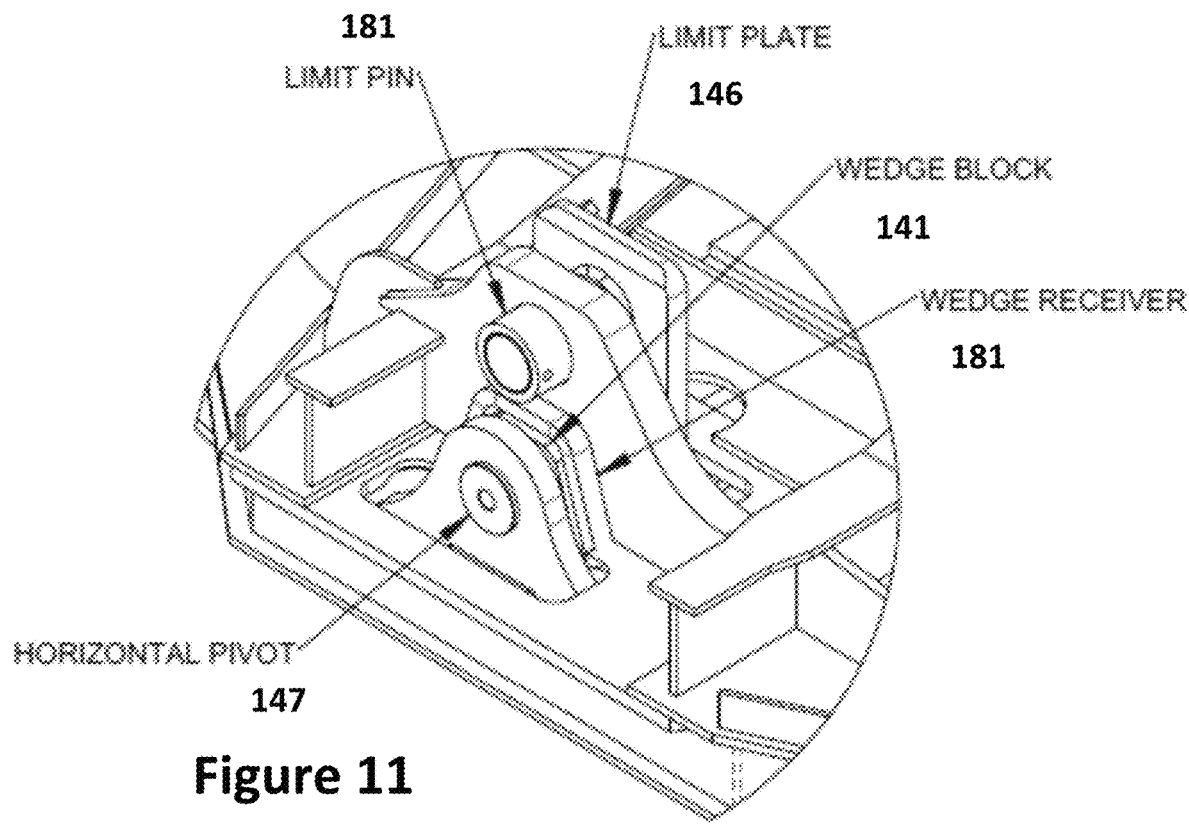
Figure 12:
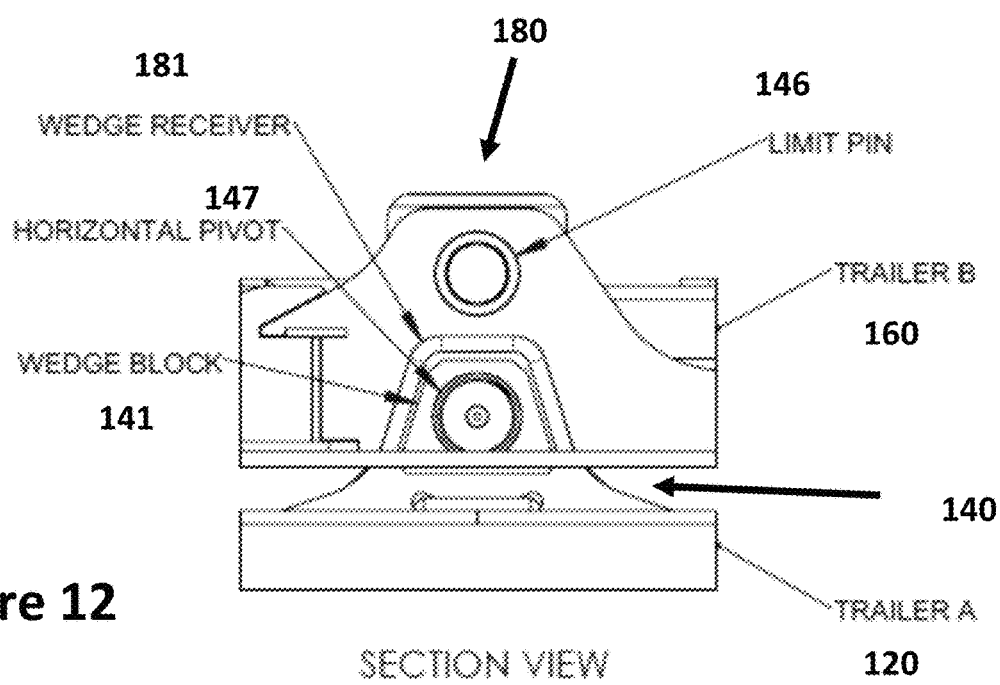

FIGS. 11 and 12 show details of the operative connected parts 140, 180 of the lateral pivot coupling supports 200 in the form of pivot and wedge assemblies on the sides of the rear of the front trailer 120 and on the front of the rear trailer 160.

The first connection 140 includes an elongated shaped engaging means 141 in the form of a wedge block which extends transversely across a portion of the front trailer 120 from adjacent a lateral side at the rear. The wedge block 141 has an inverted flanging U-shaped constant cross-section along its length. This wedge block 141 extends from a strengthened planar support 145 mounted on the floor 30 at the lateral side of the tray of the front trailer 120. The wedge block extends to a planar tall limit plate 146 mounted on the floor 30 of the front trailer 120 at an inner lateral position and extending parallel to the strengthened planar support 145. The wedge block 141 is mounted on a horizontal pivot pin 147 supported by the spaced parallel strengthened planar support 145 and the planar tall limit plate 146. This allows the wedge block to rock around a horizontal pivot.

The shaped engaging means of the wedge block 141 has multiple planar surfaces 142 around its upper circumference with bevelled edges 143 at the linear vertices between the planar surfaces. In one form the shaped engaging means 141 is a wedge block being substantially a rectangular block but with an outwardly flared vertical cross-section having a wider base than the top.

The planar tall limit plate 146 extends above the height of the wedge block 141 and includes a receiving hole 148 in the upper part to receive and limit a part of the second connection 180 as will be described later.

The second connection 180 is mounted integrally on the top of the front 65 of the second trailer 160 but with openings extending through the floor 70 so as to receive parts of the first connection 140 of the underlying back end 26 of the front trailer 120.

The second connection 180 primarily has a raised shape receiving means 181 that is a hollow elongated with constant inverted U-shape cross-section 182 that closely complements the inside shape and dimension of outwardly flared vertical cross-section of the wedge block 141 has multiple planar surfaces 142 around its upper circumference with bevelled edges 143 at the linear vertices between the planar surfaces. The body of the rear trailer 160 includes a cut-out 183 for allowing the wedge 141 of the underlying rear end 26 of the front trailer 120 to protrude through to engage the undersurface of the wedge receiver 181 on the overlying front end 64 of the rear trailer 160.

As shown by the interaction of wedge block 141 and wedge receiver over an elongated length and with close matching shapes there is a high contact between the two that stops rotation of first trailer 120 and second trailer 160 around a vertical axis. The outward flange and bevelled corners further lock the shapes together.

It should be noted that due to the wedge block 141 being mounted on the horizontal pivot 147 as shown in FIG. 3, the rear trailer 160 is maintained in a generally aligned orientation to the lead trailer 120. The coupling axis provides a maximum decline angle 128 of the rear trailer 60 relative to the lead trailer 120 of about 8°, or a maximum incline angle 130 of also about 8°. The load 124, in the embodiment being rail lengths 122, bend when the rear trailer 160 pivots about the horizontal coupling axis relative to the lead trailer 120.

The second connection 180 further includes a front portion 183 of the outer edge of the cut-out 182 adjacent the outer end of the wedge receiver 181 and a rear portion 184 of the cut-out 183 at the other end of the wedge receiver 181. The front portion 183 of the cut-out 182 can receive the strengthened planar support 145 mounted on the floor 30 at the lateral side of the tray of the front trailer 120 and protruding into the cut-out from underneath. The rear portion 184 of the cut-out 182 can receive the planar tall limit plate 146 mounted on the floor 30 of the front trailer 120 This allows for the pivotally mounted wedge block 141 to engage the wedge receiver 181.

It can be seen that the high torsion lateral stability coupling systems 200 at spaced lateral sides of the overlap of front and rear trailers 120, 160 join the multiple elongated trailers in a fixed linear following configuration in order to transport elongated loads 124 while allowing some vertical dipping of one trailer relative to another such as shown in FIG. 3. This provides a stability which thereby allows the steerability of the loads due to the combination with locking system and control of locking as will be described later.

Although this horizontal pivoting is allowable it is important as will be described further later that in operation the front and rear trailers 120, 160 remain collinear and do not pivot around a vertical axis. Only in that way will the control steering system be able to come into play.

However, it is important when connecting a second rear trailer 160 to a front trailer 120 that there is some leeway for connection but rigidity in operation. This is provided by a limit pin 186 and receiving mount in front rigid plate 185 of the second connection 180. The rigid plate 185 overlies the wedge receiver 181 and is fixed to the body of the trailer 160. The rigid pin is mountable into a receiving hole in the Thereby while the limit plate 146 is able to protrude through the rear portion 184 of the cut-out 182 and present the receiving hole 148 in the upper part, it does not yet receive and is not limited by a part of the second connection 180. Instead, due to the sizing of the front and rear portions 183, 184 of the cut-out 182 being slightly larger than the sizing of the received the strengthened planar support 145 and the received the planar tall limit plate 146 and due to the spacing of the strengthened planar support 145 and the received the planar tall limit plate 146 being slightly larger than the wedge receiver 182 there is some lateral alignment movement available. When the front and rear trailers 120, 160 are aligned the pivot pin can be fixed between the rigid plate 185 and the planar tall limit plate 146. In this way there is lateral locking of the front and rear trailers 120, 160 to prevent substantially any pivoting around the vertical axis.

The further interaction with other combination of parts in a synergistic will now be further described.

Wheels

Figure 4:
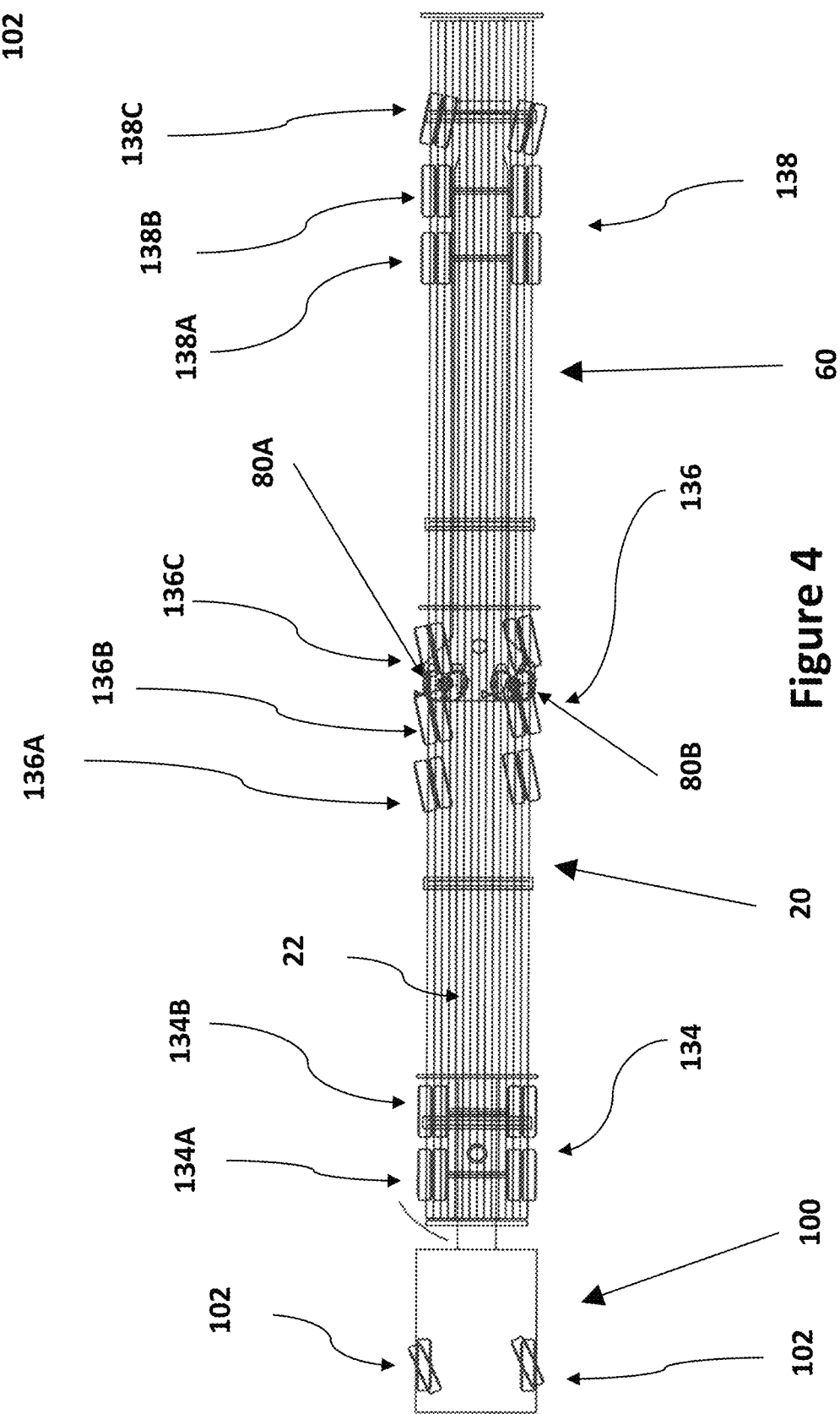
FIG. 4 is a top view of the transport assembly of FIG. 1 schematically showing the transport assembly performing a left turn in accordance with a first embodiment in which the rear axial wheels of the rear set of triaxial wheels are operating individually and the middle set of triaxial wheels are operating in unison.

The wheels are located in three triaxle sets. The wheels of different embodiments can operate in one of the following manners:

t. Manually steered axle
u. Self-steering axles
v. Self-steering caster axles
w. Automatically controlled axles As shown at the rear set of wheels of the second trailer in FIG. 4 a particular axle of wheels is steerable separate to the other axles of wheels. However as shown the rear set of three axles (triaxial) mounted at the rear of the front trailer and underlying the front of the rear trailer or at the rear of the rear trailer can operate with all three axles of the set of triaxial wheels in operative unison. An axial set of wheels or a set of triaxial wheels can be in a locked steering position or in an unlocked self-steering position in which position steering is effected by the motion effected by the steering and pulling motion of the prime mover to the trailers.

Control

Figure 18:
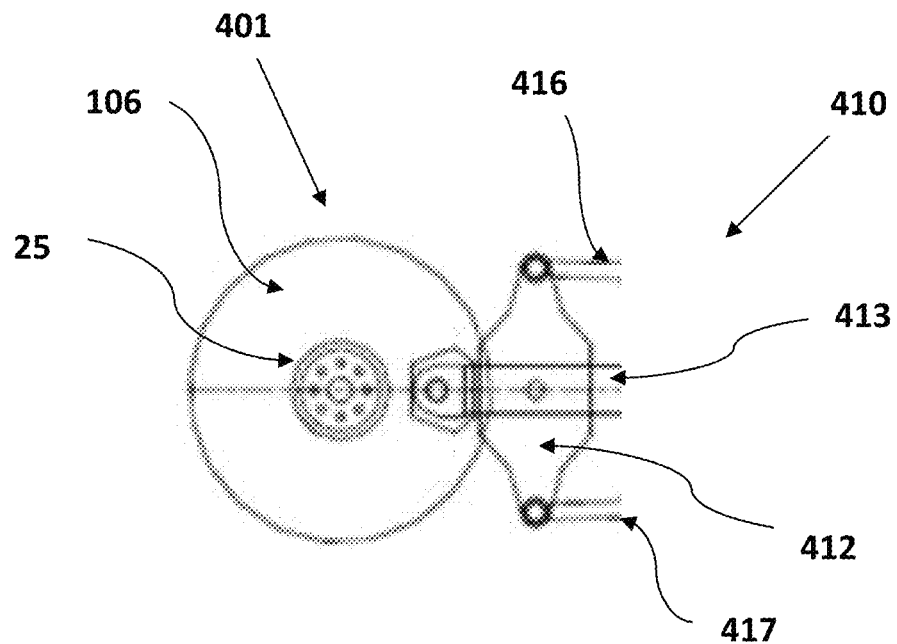
FIGS. 18 and 19 are diagrammatic views of the control of steering by use of the relative rotation of a connection at the front end of the trailer to the prime mover.
Figure 19:
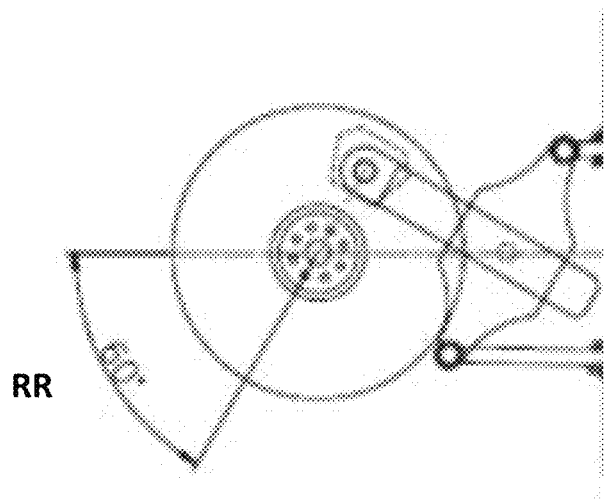

The control of the steering between the lead trailer wheel assembly and the rear trailer wheel assembly can be coordinated with regard to the connection of the front trailer 120 to the prime mover 100. As shown in FIG. 18, there is a connection 401 at the front end 24 of the trailer 120, which includes a kingpin 25 at a lower surface thereof for coupling to the fifth wheel coupling 106 of the prime mover 100. Clearly when the steering wheels 102 of the prime mover 100 are turned the rear wheels 134 of the prime mover 100 are fixed and the front trailer 120 moves relative to the prime mover and respectively the fifth wheel coupling 106 moves relative to the kingpin 25. Comparing FIG. 19 to FIG. 18 there is shown a relative rotation RR of 60° of the fifth wheel coupling 106 relative to the kingpin 25.

The control of the steering makes use of this relative rotation RR of 60° of the fifth wheel coupling 106 relative to the kingpin 25 of the connection 401 by engaging with a relative steering system 410. This system includes a steering swivel plate 412 adjacent the fifth wheel coupling 106 and having a connecting rod 413 fixedly attached to the swivel plate 412 near one end and pivotally connected to the fifth wheel coupling 106 at the other end. At opposing ends of the swivel plate 412 are left and right steering arms 416, 417.

Therefore, the relative rotation RR of the fifth wheel coupling 106 relative to the kingpin 25 effects swivelling of the swivel plate 413 and relative difference in longitudinal positions of the left and right steering arms.

The relative steering system is able to take the relative difference in longitudinal positions of right and left steering arm 416, 417 inputs and use these to steer the set of wheels 136 at the rear of the front trailer 120 or the set of wheels 138 at the rear of the rear trailer 170.

Figure 20:
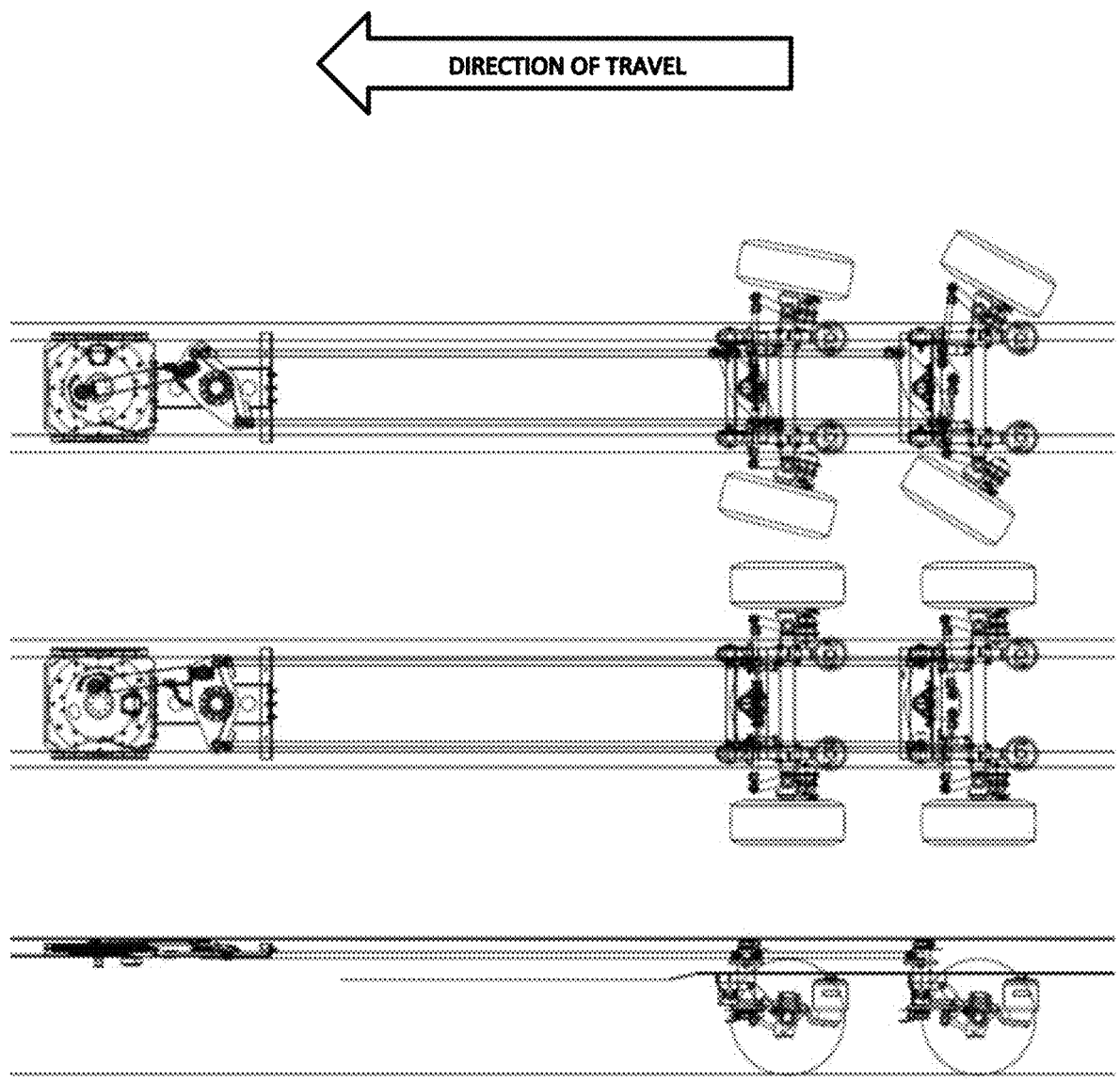
FIGS. 20, 21 and 22 are diagrammatic views of different stages of turning and different views while making use of the relative rotation of FIGS. 18 and 19 and transferring steering instructions to wheel set at rear of front and rear of rear trailers by mechanical, hydraulic and electric means respectively.
Figure 21:
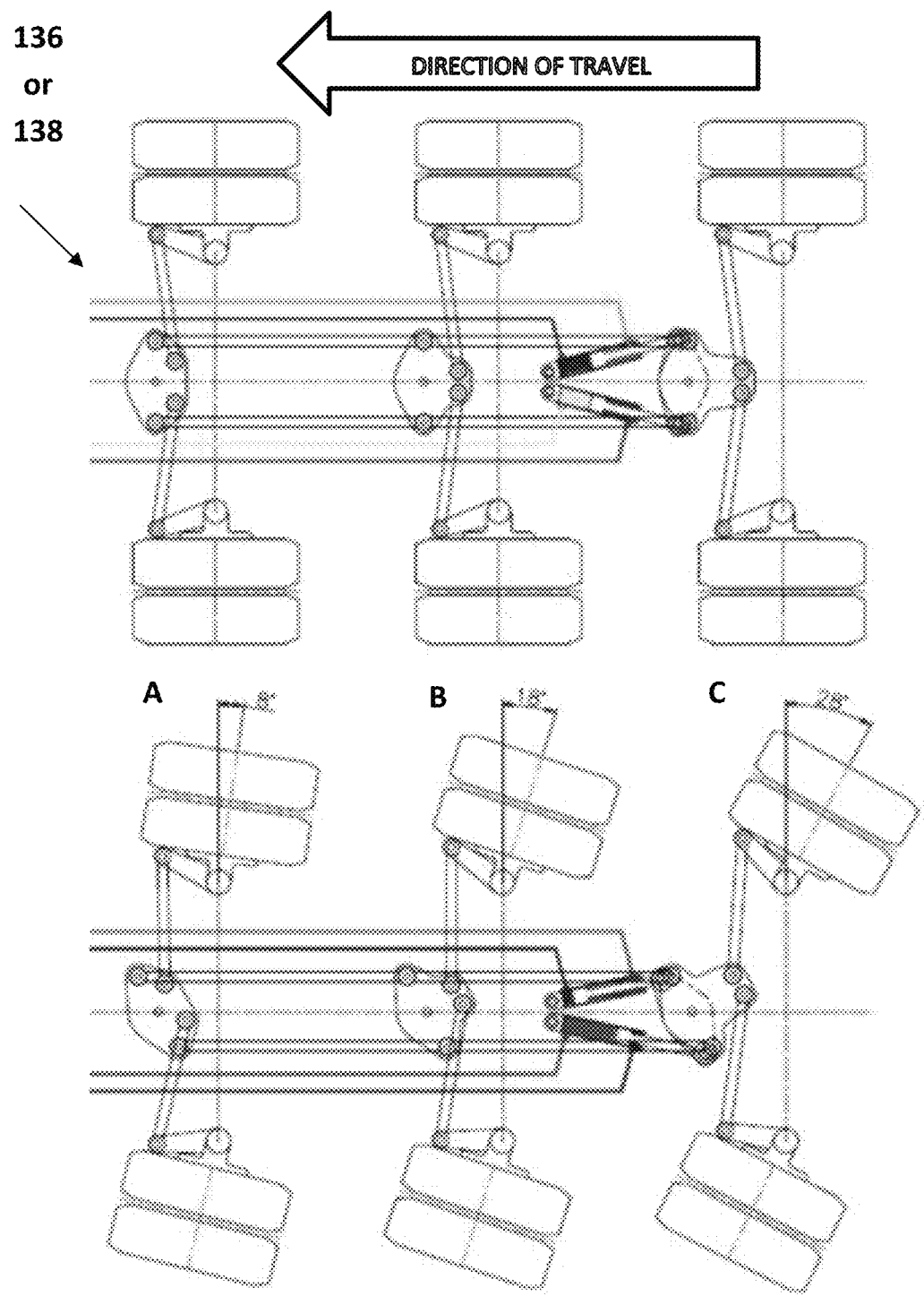
Figure 22:
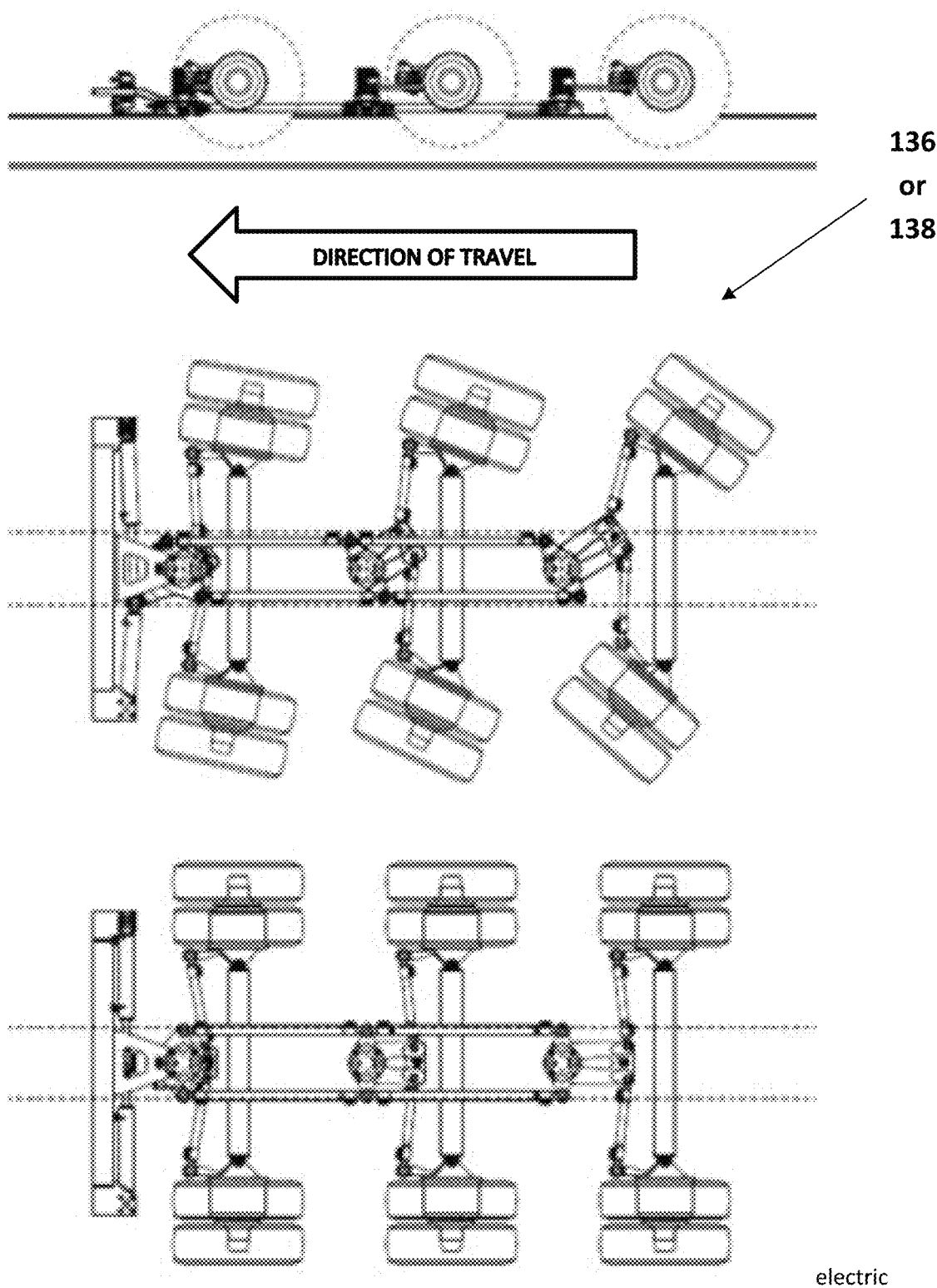

The transfer from the steering arm inputs can be by any one of:

a) Mechanical means, such as in FIG. 20 which has the right and left steering arms 416, 417 being elongated and mechanically connecting to the steering plate of each axial set of wheels of either the front or rear triaxial set of wheels 136, 138;

b) Hydraulic means, such as in FIG. 21 which has the right and left steering arms 416, 417 being input to left and right hydraulic lines connecting to the steering plate of each axial set of wheels of either the front or rear triaxial set of wheels 136, 138; or c) Electric means, such as shown in FIG. 22 which has the right and left steering arms 416, 417 being input to electrical system directly controlling electric steering motors connecting to the steering plate of each axial set of wheels of either the front or rear triaxial set of wheels 136, 138;

d) Optical such as magic eye;

e) self-steering axles and steering locks on the axles which either allow or disallow steering depending upon a logical sequence.

f) Combination of one or more of the above.

The steering of each of the set of axial wheels on each set of the triaxial sets of wheels 136, 138 can be proportional rather than all three sets of axial wheels turning at the same rate. As shown in FIG. 21 at the maximum turn angle of the front set of axial wheels of the triaxial set 136 or 138 can be angle A of 8° while the second set of axial wheels can be angle B of 18° and the third or rear axial set of wheels can be at angle C of 28°. This gives a triaxial set of wheels 136, 138 that readily swings as a set. The angles A, B and C can be proportionally varying up to this maximum angle. The choice of the maximum angle is subject to the length of the combination front and rear trailers 120, 170 and the swing requirements.

about a horizontal axis generally aligned with the longitudinal length of the lead trailer (substantially prevents "twisting" between the trailers 120 and 160). This allows the trailer assembly 10 to carry very long loads. The self-steering axles 138a to 138c at the rear end 26 of the A trailer 120 then allow the transport assembly 10 to turn around corners as required.

In one form of operation with reference to FIG. 3, when the transport assembly 10 has to perform a turn, such as a left hand turn as shown, the front steering wheels 102 of the prime mover 100 pivots to the left (relative to the forward direction), the self-steering axles turn the three wheel assemblies 136a to 136c of the lead trailer 120 in unison also to the left, and the self-steering axle of one or more of the rearmost wheel assembly 138a, 138b 138c of the rear trailer 160 is pivoted to the right.

In particular with reference to FIG. 3, the rear 3 axles 136a, 136b, 136c preferably stay locked until middle 3 axles, 138a, 138b, 138c turn to about 6 degrees. Then an electric over air signal is sent to unlock the rear 3 axles and then these follow the middle 3 axles around.

Once back 3 unlock this sends a signal to lock the middle 3 axles when they return to the centre. This is to be sure that we have control until the back 3 return to lock. Then they don't unlock until centre 3 turn to 6 degrees. And the process starts again. This turning only happens on slow turns. Never on the open highway at speed. On the open highway centre 3 axles remain unlocked, rear 3 locked.

The operation can be summarised as follows:

| Truck condition | Middle axles | Rear Axles | Middle wheels | Rear Wheels |
|---|---|---|---|---|
| Open road | unlocked | locked | straight | straight |
| Slow turn | Unlocked and turning up to turn angle of about 6 degrees | locked | Turn left up to turn angle | straight |
| Slow turn | Reach the turn angle | Unlocked | Turn left at and beyond turn angle | Turn right to follow curved path of middle wheels |
| Slow turn | Proceed after reaching turn angle and identifying rear axles unlocked then middle axles locked | Unlocked | Middle wheels complete turn then straighten with axles locked | Rear wheels continue to follow middle wheels and by being unlocked return to straight |
| Finish turn and straightened | unlocked | locked | straight | straight |

Operation

Figure 13:
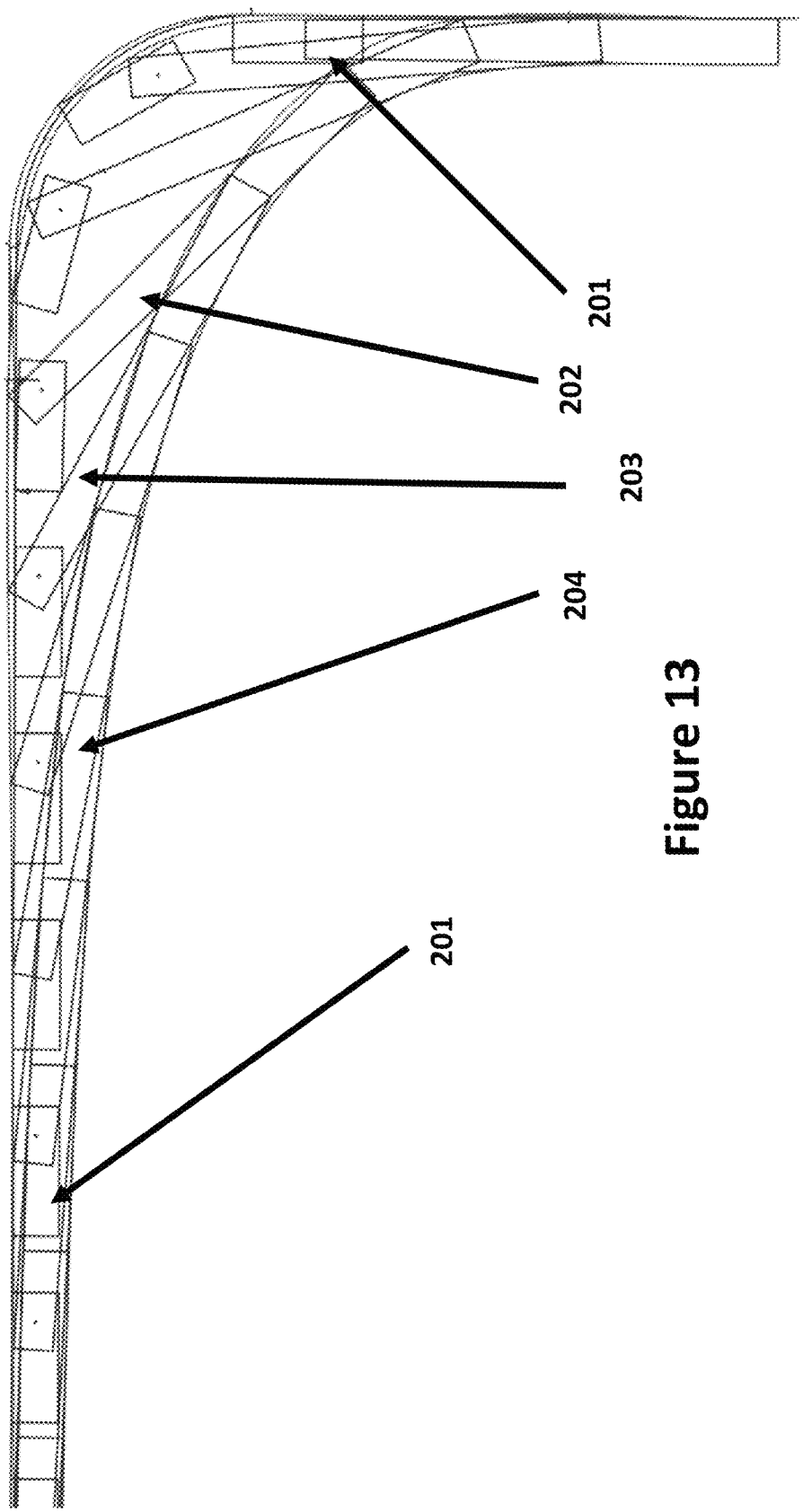
FIG. 13 is a swept path diagram of the transport assembly of FIG. 1 or FIGS. 5 and 6, schematically showing the transport assembly performing a left turn in various positions 201 to 204 and back to 201.

Referring to FIG. 13, when the transport assembly 10 has to perform a turn, such as a left hand turn as shown, the front steering wheels 102 of the prime mover 100 pivots to the left (relative to the forward direction), the self-steering axles turn the three wheel assemblies 136a to 136c of the lead trailer 120 also to the left, and the self-steering axle of the rearmost wheel assembly 138c of the rear trailer 160 is pivoted to the right.

FIG. 13 is a swept path diagram of the transport assembly 10 performing a left turn through various positions 201 to 204 and back to 201. As from the above, the coupling assembly 150 substantially locks the A and B trailers 20 and 60 together so they cannot pivot about a vertical axis, but can pivot about a horizontal axis 37 transverse to the longitudinal length of the trailers such as shown in FIG. 3.

The coupling assembly 150 also substantially prevents the rear trailer 160 from pivoting relative to the lead trailer 120

The speed of the slow turn is generally less than 30 kilometres per hour and more preferably less than 20 kilometres per hour. The system is not intended for fast angle changes but with a trailer of over 22 metres long and up to 30 metres long the arrangement is particularly to allow turning of an articulated long trailer when the carried load can be rigid elongated material such as 22 to 30 metre railway lines extending over both trailers.

The turn angle at which the locking/unlocking of middle and rear axles occur can be predetermined to suit the particular truck dimensions and usual load length and could be in the range of 4 degrees to 10 degrees deviation from the straight-ahead configuration. Preferably it is 6 degrees.

In a second mode of operation, all three triaxial wheels in a set 136, 138 operate in unison. The swept path diagram of the transport assembly of FIG. 1 or FIGS. 5 and 6, schematically showing the transport assembly performing a left turn in various positions 201 to 204 and back to 201. The triaxial wheels 136, 138 can be self-steering caster axles with locking mechanism.

Whilst proceeding in a straight line in straight position 201 as shown in FIG. 14, the steering wheels 102 of the prime mover 100 and wheels 134 supporting the front trailer 120 are fixed in a facing forward position. The middle set of triaxial wheels 136 has steering unlocked and therefore just follows the prime mover but allows steering as required to minimise turn radius and steer tyre friction. However, for stability and control the rear set of triaxial wheels 138 are locked in a straight position.

Figure 16:
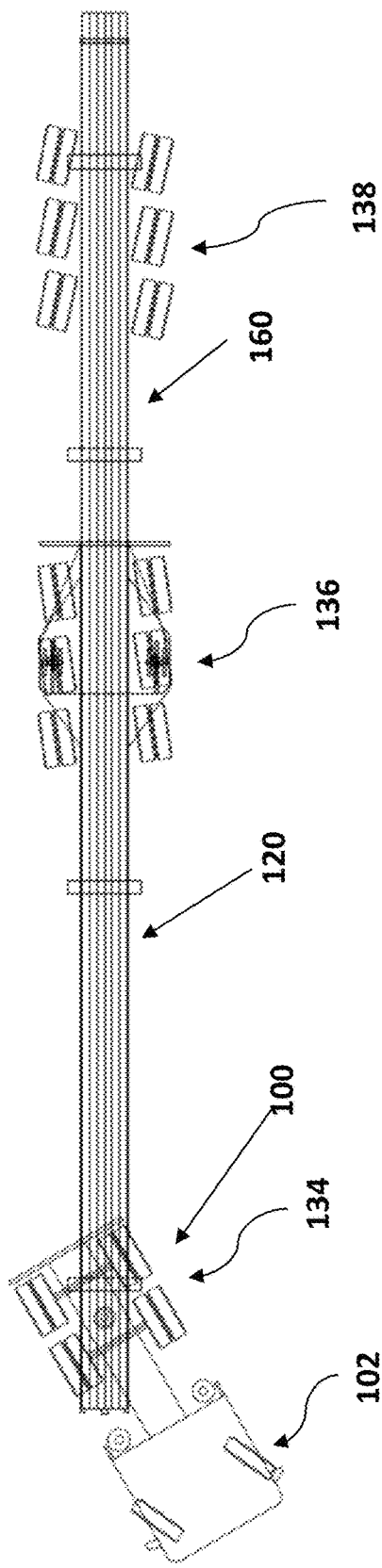

In the commencement of the left-hand turn into position 202 of FIG. 15, the steering wheels 102 of the prime mover 100 are steered left and the middle set of triaxial wheels 136 still in the unlocked position are able to follow and self-steer towards a left turn. In the meantime, the rear set of triaxial wheels 138 remain in a straight locked steering position In the further progression of the left-hand turn into position 203 of FIG. 16, the steering wheels 102 of the prime mover are steered further left and the middle set of triaxial wheels 136 still in the unlocked position are able to follow and self-steer towards a left turn. In the meantime, the rear set of triaxial wheels 138 remain in a straight locked steering position. However, when the middle set of triaxial wheels 136 reach a steering angle left which exceeds a predetermined steering limit, the rear set of triaxial wheels 138 have their steering unlocked allowing the rear set of triaxial wheels 138 to steer in the opposite direction—which in this case is towards the right. At the same time the middle set of triaxial wheels 136 have re-locked to maintain stability. The rear set of triaxial wheels 138 are then able to self-steer in a curved manner to the right to follow the left curve of the middle set of thereby and provide a more effective left turn with a smaller turning angle.

Figure 17:
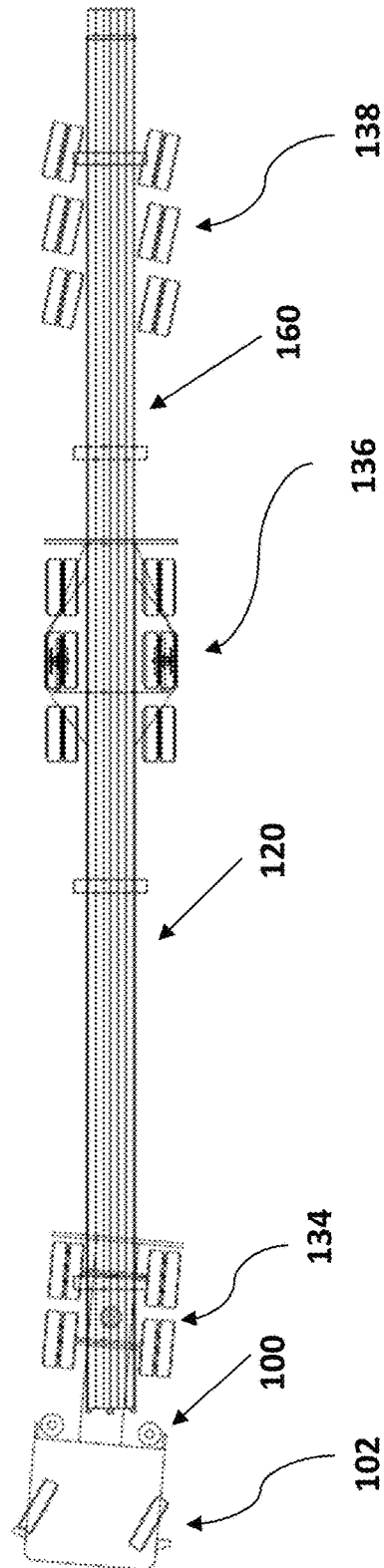

At near the completion of the left turn and in order to straighten up as in position 204 of FIG. 17, the steering wheels 102 of the prime mover 100 are directed to the right and the middle set of triaxial wheels 136 follow and steer back to a locked straight-ahead position. The rear set of triaxial wheels 138 are unlocked and follow so that they return to the straight-ahead position. Then the rear set of triaxial wheels 138 are locked straight and the middle set of triaxial wheels 136 are unlocked in a self-steering mode. This position is then the starting straight ahead position 201 of FIG. 14 ready for any further turns.

Therefore, it can be seen that the operation of the sets of triaxial wheels 136 and 138 are as follows in the various positions of a turn:

It should be noted that the rear axles do not need to be electrically connected to the front trailer or the driver's cabin in order to ensure relative locking and unlocking control. Instead there can be markers located underneath such as flags and a magic eye or electromagnetic proximity sensor to detect the change of angle of the middle axles or steering rod of the middle axles or wheels attached to the middle axles. When the turn angle is determined remotely by this system at the rear axles then a solenoid can be activated to lock or unlock the rear axles accordingly.

Clearly the present trailer assembly is much more cost effective to build and run for transporting loads of long materials than other available systems. The embodiment shows a load of railway lines, however the trailer assembly can be used to carry any long material. The use of self-steering axles and steering locks on the axles which either allow or disallow steering depending upon a logical sequence is the simplest and most effective method to achieve the desired result. However, there can be other options.

Figure 23:
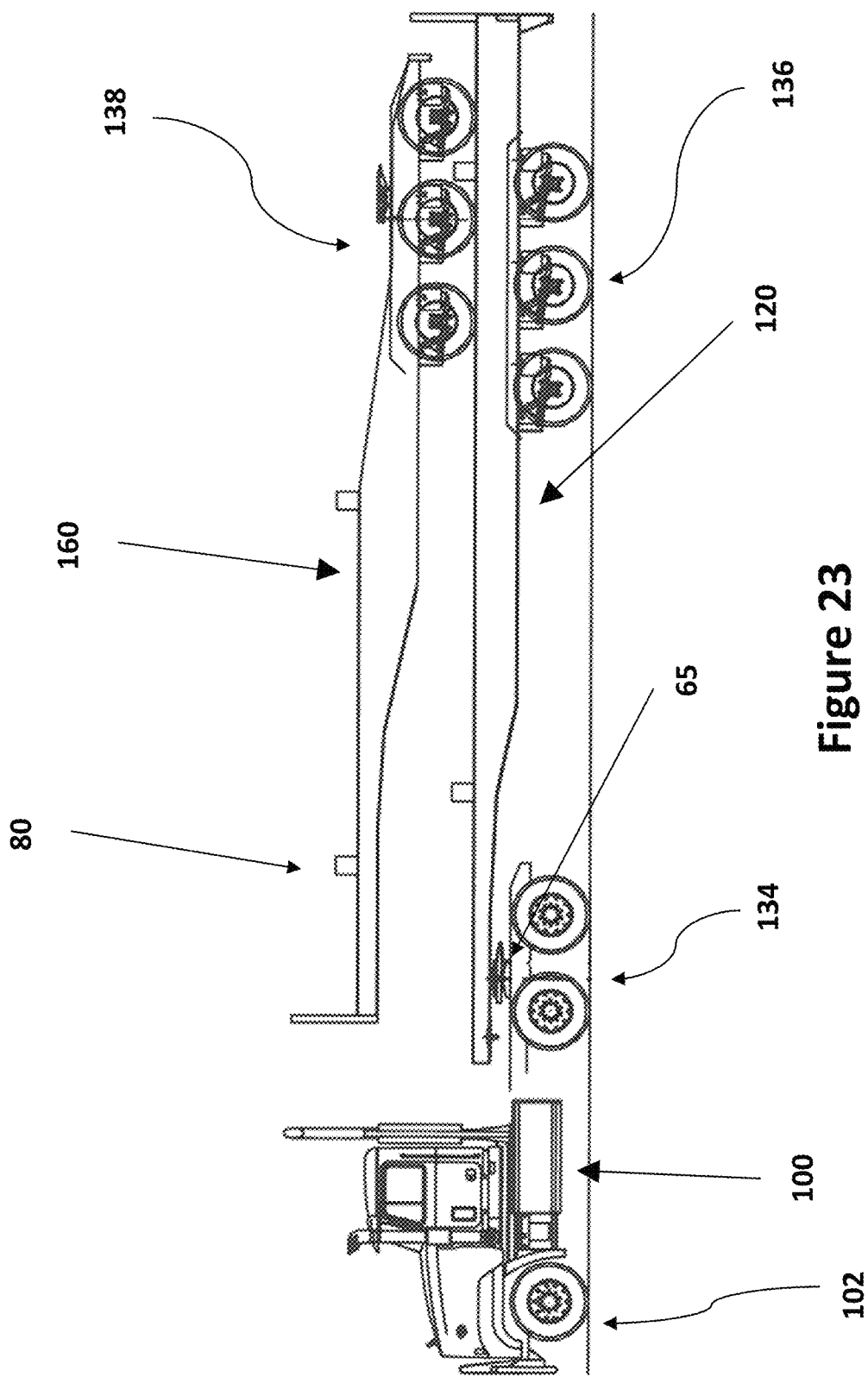
FIG. 23 is a side view of the transport assembly of FIG. 1 in the transport configuration, with the lead trailer loaded onto the rear trailer.

Referring to FIG. 23, when the trailer assembly 10 is not carrying a load, the rear trailer 160 is coupled to the fifth wheel coupling 106 of the prime mover 100 via the central kingpin 65, and the front trailer 120 is loaded onto the rear trailer 160.

Other Embodiments

Whilst preferred embodiments of the present invention have been described, it will be apparent to skilled persons that modifications can be made to the embodiments described.

For example, the number of wheel assemblies in the trailers can be increased or decreased as required. Also, the coupling assembly between the lead trailer and the rear trailer can be embodied in other forms.

For example, the fifth wheel couplings and kingpins can be replaced by two rigid arms, laterally spaced from each other, rigidly attached to one of the trailers and pivotably attached to the other trailer. Alternatively, the arms can be pivotably attached to both the lead trailer and the rear trailer. Such pivotal attachment can be removable for transporting one trailer on top of another if desired.

Also, both the lead and the rear trailers can be constructed to be respectively extendable, to allow the trailer assembly to carry longer loads. Also, the rear trailer wheel assemblies can alternatively all have manually steered axles to assist the trailer assembly in performing turns, or a combination of

| Position | Prime Mover steering wheels | Middle set of triaxial wheels | Rear set of triaxial wheels |
|---|---|---|---|
| 201 | straight | Straight and unlocked | Straight and locked |
| 202 | steered left | Following in self-steering unlocked mode left | Following in Locked mode in straight position |
| 203 | steered further left | Following in a self-steering unlocked mode left until reaching a preset angle and then switching the lock to re-lock the next time the axle reaches a straight-ahead position. | Locked until reaching pre-set angle then unlocking and self-steering right |
| 204 | Steered right | Locked after steering back to straight ahead position | Unlocked until steering back to the straight-ahead position and locking |
| 201 | straight | Straight and unlocked | Straight and locked | manually steered axles and self-steering axles. For example, the rearmost axle can be self-steering and the other two can be manually steered.

Still further in operation of controlling steering of the at least one lead trailer wheel assembly of a multiple axle wheel and the at least one rear trailer wheel assembly of a multiple axle wheel there can be systems which are not dependent upon the "locking" of the self-steering. Other methods to control the steering can be a controlling means such as hydraulic cylinders (or pneumatic or electric actuators) attached to the steer axles, a method for measuring the steering angles of some/all of the axles, and a programmable logic circuit (PLC) to control the steering angle of the axle groups relative to each other.

Alternatively, there can be a mechanical control device which controls the steering of each axle group dependent upon the angle between the prime mover and the first trailer.

It can be seen though that the invention makes use of a steering control means for controlling at least one lead trailer wheel assembly of a multiple axle wheel assembly acting separately or in unison and at least one rear trailer wheel assembly of a multiple axle wheel assembly acting separately or in unison wherein the operation between the lead trailer wheel assembly and the rear trailer wheel assembly is coordinated with the coupling.

For example the steering control means controls steering automatically such that when a turn in a first direction is effected by the steering wheels of a prime mover:
x. initially the supporting wheels of the front trailer are turning in the first direction until reaching a predetermined maximum turning angle and while the supporting wheels of the rear trailer are in a straight-ahead position; and
y. the halting of the turning of the supporting wheels of the front trailer and the turning in a second direction being to the opposite side of first direction of the supporting wheels of the rear trailer so that the rear wheels can steer in a continuous C-curve or reverse C-curve by the motion effected by the steering and pulling motion of the prime mover and the front trailer;
z. the straightening and or turning of the steering wheels of the prime mover further switching to effect, by the motion effected by the steering and pulling motion of the prime mover back to a substantially straight position of the supporting wheels of the front trailer and the supporting wheels of the rear trailer returning to a straight-ahead position.

Other embodiments would be understood by a skilled person in the field and are included within the scope of this invention.

Interpretation
Embodiments:

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

It is apparent from the above, that the arrangement described is applicable to the transport industry.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The claims defining the invention are as follows:

1. A trailer assembly comprising:
   a lead trailer comprising a body having a front end and a rear end, the front end comprising a connection means for connection to a prime mover having steerable wheels forming steering wheels and the rear end comprising at least one lead trailer wheel assembly having a self-steering axle;
   a rear trailer comprising a body having a front end and a rear end, the rear end comprising at least one rear trailer wheel assembly;
   a coupling means between the lead trailer and the rear trailer, wherein the coupling means comprises two laterally spaced connections between following connected trailers to substantially prevent pivoting of one trailer to another around a vertical axis;
   a steering control means for controlling the at least one lead trailer wheel assembly of a multiple axle wheel assembly acting separately or in unison and at least one rear trailer wheel assembly of a multiple axle wheel assembly acting separately or in unison wherein the operation between the lead trailer wheel assembly and the rear trailer wheel assembly is coordinated with the connection to the prime mover;
   wherein the coupling means allows the rear trailer to pivot relative to the lead trailer substantially about a generally horizontal coupling axis extending transverse to the longitudinal length of the lead trailer;
   wherein the steering control means controls automatically, the at least one lead trailer wheel assembly of a multiple axle wheel and the at least one rear trailer wheel assembly of a multiple axle wheel;
   wherein the steering control means controls steering automatically such that when a turn in a first direction is effected by the steering wheels of the prime mover:
   a. initially supporting wheels of the lead trailer are turning in the first direction until reaching a predetermined maximum turning angle and while supporting wheels of the rear trailer are in a straight-ahead position; and
   b. the halting of the turning of the supporting wheels of the lead trailer and the turning in a second direction being to the opposite side of first direction of the supporting wheels of the rear trailer so that rear wheels of the wheels supporting the rear trailer can steer in a continuous C-curve or reverse C-curve by the motion effected by the steering and pulling motion of the prime mover and the lead trailer;
   c. the straightening and or turning of the steering wheels of the prime mover further switching to effect, by the motion effected by the steering and pulling motion of the prime mover back to a substantially straight position of the supporting wheels of the lead trailer and the supporting wheels of the rear trailer returning to a straight-ahead position.

2. The trailer assembly of claim 1 wherein the automatic control of the steering control means is effected when the at least one lead trailer wheel assembly of a multiple axle wheel and the at least one rear trailer wheel assembly of a multiple axle wheel reach predetermined effecting angles relative to the angle of the at least one lead trailer wheel assembly or the at least one rear trailer wheel assembly to the first and second trailer;
   wherein the automatic control of the steering control means is effected when the at least one lead trailer wheel assembly of a multiple axle wheel and the at least one rear trailer wheel assembly of a multiple axle wheel reach predetermined effecting angles relative to the angle of the prime mover to the first and second trailer; and
   wherein the automatic control of the steering control means is effected by a steering control based on prime mover to front trailer angle, providing a proportional steering control to the relative rotation of the connection of the lead trailer to the prime mover.

3. The trailer assembly of claim 1 wherein the steering control means further includes a locking means on the at least one lead trailer wheel assembly having at least one self-steering axle or a multiple axle wheel assembly acting in unison and a locking means on the rear trailer comprises a rear trailer wheel assembly having at least one self-steering axle or a multiple axle wheel assembly acting in unison.

4. The trailer assembly of claim 3 further includes a control for controlling the locking means automatically such that:
  a. initially the locking means is able to effect the supporting wheels of the lead trailer to be in an unlocked self-steering mode until reaching a predetermined maximum turning angle and while the supporting wheels of the rear trailer are in a locked straight-ahead position; and
  b. switching of the locking means effects the locking of the supporting wheels of the lead trailer to re-lock once the supporting wheels of the lead trailer are in a straight-ahead position, and unlocking of the supporting wheels of the rear trailer so that the rear wheels can self-steer by the motion effected by the steering and pulling motion of the prime mover and the lead trailer;
  c. further switching of the locking means to effect, after self-steering by the motion effected by the steering and pulling motion of the prime mover back to a substantially straight position, of the supporting wheels of the lead trailer to be in an unlocked self-steering mode and the supporting wheels of the rear trailer are in a locked straight-ahead position.

5. The trailer assembly of claim 1 wherein the coupling means comprises a coupling assembly comprising at least two laterally spaced fifth wheel couplings provided at the rear end of the lead trailer and at least two corresponding kingpins provided at a front end of the rear trailer.

6. The trailer assembly of claim 1 wherein the lead trailer comprises at least one lead trailer wheel assembly having at least one self-steering axle or a multiple axle wheel assembly acting in unison and the rear trailer comprises a rear trailer wheel assembly having at least one self-steering axle or a multiple axle wheel assembly acting in unison.

7. The trailer assembly of claim 6 wherein the rear trailer wheel assembly self-steering axles are operative in accordance with the determined operation of the at least one lead trailer wheel assembly self-steering axle when in a slow turning operation.

8. A trailer assembly comprising:
  a lead trailer comprising a body having a front end and a rear end, the front end comprising a connection means for connection to a prime mover having steerable wheels forming steering wheels and the rear end comprising at least one lead trailer wheel assembly having a self-steering axle;
  a rear trailer comprising a body having a front end and a rear end, the rear end comprising at least one rear trailer wheel assembly;
  a coupling means between the lead trailer and the rear trailer, wherein the coupling means comprises two laterally spaced connections between following connected trailers to substantially prevent pivoting of one trailer to another around a vertical axis;
  a steering control means for controlling the at least one lead trailer wheel assembly of a multiple axle wheel assembly acting separately or in unison and at least one rear trailer wheel assembly of a multiple axle wheel assembly acting separately or in unison wherein the operation between the lead trailer wheel assembly and the rear trailer wheel assembly is coordinated with the connection to the prime mover;
  wherein the coupling means allows the rear trailer to pivot relative to the lead trailer substantially about a generally horizontal coupling axis extending transverse to the longitudinal length of the lead trailer;
  wherein the steering control means controls automatically, the at least one lead trailer wheel assembly of a multiple axle wheel and the at least one rear trailer wheel assembly of a multiple axle wheel;
  wherein the coupling means provides a high torsion connection and wherein the coupling means includes:
    a. an elongated shaped engaging means mounted pivotably between two supports so as to extend in a transverse direction to the elongated length a first of the trailers;
    b. a raised shape receiving means that is hollow and overlies a cut-out in a second of the trailers for receiving and engaging the elongated shaped engaging means;
    c. a locking means for locking laterally and limiting vertically in relative fixed positions the elongated shaped engaging means and the raised shape receiving means;
  wherein the connected trailers are substantially prevented from relatively pivoting around a vertical axis but have limited pivoting around a transverse horizontal axis to allow limited different dipping relative to each other.

9. The trailer assembly of claim 8 wherein the coupling means substantially limits the rear trailer from pivoting relative to the lead trailer about any vertical axis.

10. The trailer assembly of claim 9 wherein the coupling means provides a maximum decline angle of the rear trailer relative to the lead trailer of about 8° and/or a maximum incline angle of about 8°.

11. The trailer assembly of claim 8 wherein the coupling means substantially limits the rear trailer from pivoting relative to the lead trailer about a horizontal axis generally aligned with the longitudinal length of the lead trailer.

12. A trailer assembly comprising:
  a lead trailer comprising a body having a front end and a rear end, the front end comprising a connection means for connection to a prime mover having steerable wheels forming steering wheels and the rear end comprising at least one lead trailer wheel assembly having a self-steering axle;
  a rear trailer comprising a body having a front end and a rear end, the rear end comprising at least one rear trailer wheel assembly;
  a coupling means between the lead trailer and the rear trailer, wherein the coupling means comprises two laterally spaced connections between following connected trailers to substantially prevent pivoting of one trailer to another around a vertical axis;
  a steering control means for controlling the at least one lead trailer wheel assembly of a multiple axle wheel assembly acting separately or in unison and at least one rear trailer wheel assembly of a multiple axle wheel assembly acting separately or in unison wherein the operation between the lead trailer wheel assembly and the rear trailer wheel assembly is coordinated with the connection to the prime mover;
  wherein the coupling means allows the rear trailer to pivot relative to the lead trailer substantially about a generally horizontal coupling axis extending transverse to the longitudinal length of the lead trailer;

wherein the steering control means controls automatically, the at least one lead trailer wheel assembly of a multiple axle wheel and the at least one rear trailer wheel assembly of a multiple axle wheel;

wherein the lead trailer comprises at least one lead trailer wheel assembly having at least one self-steering axle or a multiple axle wheel assembly acting in unison and the rear trailer comprises a rear trailer wheel assembly having at least one self-steering axle or a multiple axle wheel assembly acting in unison wherein the rear trailer wheel assembly self-steering axles are operative in accordance with the determined operation of the at least one lead trailer wheel assembly self-steering axle when in a slow turning operation;

wherein the rear trailer wheel assembly self-steering axles is locked until the determined operation of the at least one lead trailer wheel assembly self-steering axle reaches a limiting turn angle.

13. The trailer assembly of claim 12 wherein the limiting turn angle is a predetermined angle in the range of 4 degrees to 10 degrees.

14. The trailer assembly of claim 12 wherein the determined operation of the at least one lead trailer wheel assembly self-steering axle is detected wirelessly by a detector mounted at or near the rear trailer wheel assembly self-steering axles.

15. The trailer assembly of claim 14 wherein the detector is an optical sensor detecting the turning angle of the at least one lead trailer wheel assembly self-steering axle and whether a limiting turn angle is reached.

16. The trailer assembly of claim 14 wherein the detector is associated with a activator for locking or unlocking the rear trailer wheel assembly self-steering axles upon the at least one lead trailer wheel assembly self-steering axle being detected by the detector to have
   b. reached the limiting turn angle and unlock the rear trailer wheel assembly self-steering axles or
   b. reaching a straight-ahead angle and locking the rear trailer wheel assembly self-steering axles.

17. The trailer assembly of claim 16 wherein the activator for locking or unlocking the rear trailer wheel assembly self-steering axles is a solenoid.

18. A method of transporting and steering extensive elongated loads using a prime mover and multiple elongated trailers including at least a front trailer and a rear trailer each having a set of rear wheels forming rear sets of supporting wheels of the front trailer and the rear trailer, the method comprising the steps of:
   a. providing a pivotal connection at a front of the front trailer around a vertical axis for connection to and pulling by the prime mover;
   b. providing a connection between an overlapping rear of the front trailer and a front of the rear trailer over the rear set of supporting wheels of the front trailer;
   c. providing lateral stability coupling systems on the sides of the overlapping rear of the front trailer and the front of the rear trailer substantially preventing pivoting rotation of one trailer to the connected other trailer around a vertical axis;
   d. providing a locking mechanism for a part of or the rear set of supporting wheels of the front trailer;
   e. controlling the locking mechanism of the part of or the rear set of supporting wheels of the front trailer such that generally, if the supporting wheels of the front trailer are locked, the supporting wheels of the rear trailer are unlocked and able to self-steer by the motion effected by the steering and pulling motion of the prime mover.

19. A method according to claim 18 wherein in a turn effected by steering the prime mover in the steps of:
   a. initially the locking mechanism effecting the supporting wheels of the front trailer to be in an unlocked self-steering mode until reaching a predetermined maximum turning angle and while the supporting wheels of the rear trailer are in a locked straight-ahead position; and
   b. switching of the locking mechanism to effect the locking of the supporting wheels of the front trailer and unlocking of the supporting wheels of the rear trailer so that the rear wheels can self-steer by the motion effected by the steering and pulling motion of the prime mover and the front trailer;
   c. further switching of the locking mechanism to effect, after self-steering by the motion effected by the steering and pulling motion of the prime mover back to a substantially straight position, of the supporting wheels of the front trailer to be in an unlocked self-steering mode and the supporting wheels of the rear trailer are in a locked straight-ahead position.

20. A method according to claim 19 wherein the lateral stability coupling systems includes providing provides a high torsion connection and wherein the coupling means includes
   a. an elongated shaped engaging means mounted pivotably between two supports so as to extend in a transverse direction to the elongated length a first of the trailers;
   b. a raised shape receiving means that is hollow and overlies a cut-out in a second of the trailers for receiving and engaging the elongated shaped engaging means;
   c. a locking means for locking laterally in relative fixed positions the elongated shaped engaging means and the raised shape receiving means;
wherein the connected trailers are substantially prevented from relatively pivoting around a vertical axis but have limited pivoting around a transverse horizontal axis to allow limited different dipping relative to each other.

* * * * *

UNITED STATES PATENT AND TRADEMARK OFFICE
CERTIFICATE OF CORRECTION

| | |
|---|---|
| PATENT NO. | : 11,459,032 B2 |
| APPLICATION NO. | : 16/729022 |
| DATED | : October 4, 2022 |
| INVENTOR(S) | : Leigh Dehne et al. |

Page 1 of 1

It is certified that error appears in the above-identified patent and that said Letters Patent is hereby corrected as shown below:

In the Claims

Column 23, Line 36, cancel the text "b. reached the limiting turn angle and unlock the rear", and insert the following:
-- a. reached the limiting turn angle and unlock the rear --

Signed and Sealed this
Sixth Day of December, 2022

Katherine Kelly Vidal
*Director of the United States Patent and Trademark Office*